(12) United States Patent
Schlaudraff et al.

(10) Patent No.: US 12,106,454 B2
(45) Date of Patent: Oct. 1, 2024

(54) IMAGE PROCESSING APPARATUS AND METHOD FOR USE IN AN AUTOFOCUS SYSTEM

(71) Applicant: LEICA MICROSYSTEMS CMS GMBH, Wetzlar (DE)

(72) Inventors: Falk Schlaudraff, Butzbach (DE); Markus Schechter, Frankfurt (DE); Frank Sieckmann, Eppingen (DE); Oliver Schlicker, Wetzlar (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 276 days.

(21) Appl. No.: 17/637,480

(22) PCT Filed: Aug. 31, 2020

(86) PCT No.: PCT/EP2020/074219
§ 371 (c)(1),
(2) Date: Feb. 23, 2022

(87) PCT Pub. No.: WO2021/038103
PCT Pub. Date: Mar. 4, 2021

(65) Prior Publication Data
US 2022/0277441 A1    Sep. 1, 2022

(30) Foreign Application Priority Data

Aug. 30, 2019 (EP) .................................... 19194731

(51) Int. Cl.
*G06T 5/73* (2024.01)
*G02B 7/38* (2021.01)
(Continued)

(52) U.S. Cl.
CPC .............. *G06T 5/73* (2024.01); *G02B 7/38* (2013.01); *G02B 21/12* (2013.01); *G02B 21/244* (2013.01);
(Continued)

(58) Field of Classification Search
CPC .... G06T 5/73; G06T 5/10; G06T 5/20; G06T 5/70; G06T 7/0012; G06T 2207/10068;
(Continued)

(56) References Cited

U.S. PATENT DOCUMENTS 4,958,920 A * 9/1990 Jorgens ................ G02B 21/245
                                                        250/201.3
8,912,501 B2   12/2014 Yamane et al.
(Continued)

FOREIGN PATENT DOCUMENTS

CN   101795361 A   8/2010
CN   102223477 A   10/2011
(Continued)

OTHER PUBLICATIONS

International preliminary report on patentability for PCT/EP2020/074219 dated Mar. 1, 2022 (Year: 2022).*
(Continued)

*Primary Examiner* — Juan A Torres
(74) *Attorney, Agent, or Firm* — LEYDIG, VOIT & MAYER, LTD.

(57) ABSTRACT

An image processing apparatus for determining a focused output image in a passive autofocus system is configured to retrieve a set of input images and compute a baseline estimate for at least one input image. The baseline estimate represents image structures in the input image. The image structures have a length scale larger than a predetermined image feature length scale. The image processing apparatus is further configured to compute a set of output images,
(Continued)

wherein each output image of the set of output images is computed based on one of a different input image of the set of input images and the at least one baseline estimate for the different input image and the at least one baseline estimate for a respective different input image. The image processing apparatus is further configured to determine one output image of the set of output images as the focused output image.

18 Claims, 4 Drawing Sheets

(51) Int. Cl.
  G02B 21/12 (2006.01)
  G02B 21/24 (2006.01)
  G06F 17/13 (2006.01)
  G06F 17/15 (2006.01)
  G06T 5/10 (2006.01)
  G06T 5/20 (2006.01)
  G06T 5/70 (2024.01)
  G06T 7/00 (2017.01)
  G06V 10/30 (2022.01)
  H04L 25/02 (2006.01)
  H04N 25/615 (2023.01)

(52) U.S. Cl.
  CPC .............. *G06F 17/13* (2013.01); *G06F 17/15* (2013.01); *G06T 5/10* (2013.01); *G06T 5/20* (2013.01); *G06T 5/70* (2024.01); *G06T 7/0012* (2013.01); *G06V 10/30* (2022.01); *H04L 25/025* (2013.01); *H04N 25/615* (2023.01); G06T 2207/10056 (2013.01); G06T 2207/10068 (2013.01); G06T 2207/20056 (2013.01); G06T 2207/20081 (2013.01); G06T 2207/20084 (2013.01); G06T 2207/30024 (2013.01)

(58) Field of Classification Search
  CPC ........ G02B 7/38; G02B 21/12; G02B 21/244; G06F 17/13; G06F 17/15; G06V 10/30; H04L 25/025; H04N 25/615
  USPC ........................................................ 382/128
  See application file for complete search history.

(56) References Cited

U.S. PATENT DOCUMENTS

| | | |
|---|---|---|
| 2007/0248268 A1 | 10/2007 | Wood |
| 2009/0263002 A1* | 10/2009 | Cremer ................ G06T 5/20 |
| | | 382/133 |
| 2010/0194971 A1 | 8/2010 | Li et al. |
| 2011/0249173 A1 | 10/2011 | Li et al. |
| 2014/0240578 A1 | 8/2014 | Fishman et al. |
| 2017/0257613 A1* | 9/2017 | Lee ................ H04N 13/128 |
| 2018/0329194 A1 | 11/2018 | Small et al. |
| 2021/0118102 A1* | 4/2021 | Walter ................ G06T 5/70 |
| 2023/0274392 A1* | 8/2023 | Walter ................ G06T 7/194 |
| | | 382/299 |

FOREIGN PATENT DOCUMENTS

| | | |
|---|---|---|
| JP | 2013/195551 A | 9/2013 |
| JP | 2015/222311 A | 12/2015 |

OTHER PUBLICATIONS

Wang, G. et al. (2014): Morphological Background Detection and Illumination Normalization of Text Image with Poor Lighting, PLoS One, 9 (II), e110991, Nov. 26, 2014, US, pp. 1-22.

Idier, J. (2001): Convex Half-Quadratic Criteria and Interacting Variables for Image Restoration, IEEE Transactions on Image Processing, 10(7), pp. 1001-1009, US, Jul. 7, 2001.

Mazet, V., Carteret, C., Bire, D, Idier, J., and Humbert, B.: Background Removal from Spectra by Designing and Minimizing a Non-Quadratic Cost Function, Chemometrics and Intelligent Laboratory Systems, 76, pp. 121-133, Elsevier, Netherlands, Nov. 25, 2004.

Groen, F.C.; Young, I.T.; Ligthart G. (1985): A Comparison of Different Focus Functions for Use in Autofocus Algorithms, in: Cytometry 1985, 6(2): 81-91, Alan Liss, US, Mar. 1, 1985.

Yim Jonghwa and Kyung-Ah Sohn: "Enhancing the Performance of Convolutional Neural Networks on Quality Degraded Datasets", Oct. 2017, IEEE, US, pp. 1-8.

Song W et al.: "Assessing mitochondrial morphology and dynamics using fluorescence wide-field microscopy and 3D image processing", Oct. 24, 2008, Methods, Elsevier, Netherlands, pp. 295-303.

Bai Xiangzhi and Fugen Zhou: "A unified form of multi-scale top-hat transform based algorithms for image processing", May 1, 2012, Optik, Elsevier, Netherlands, pp. 1614-1619.

* cited by examiner

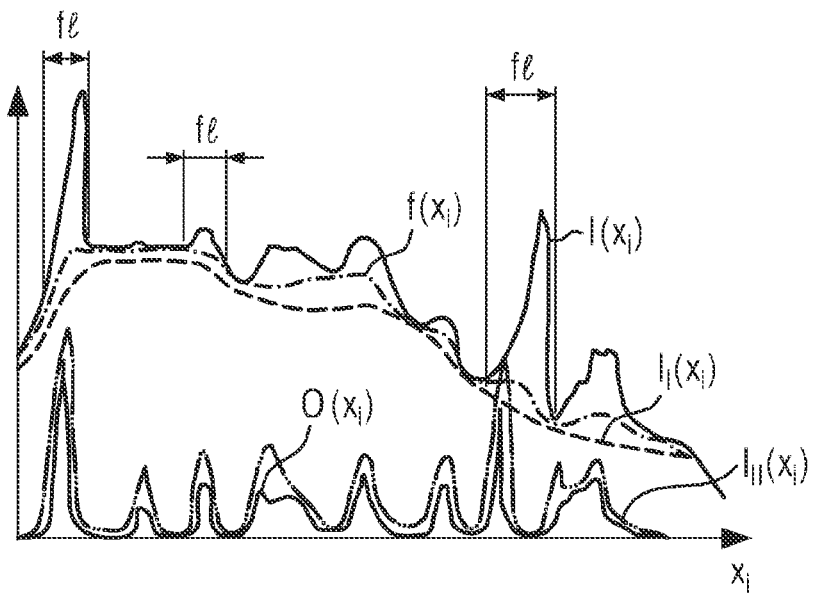
FIG. 2
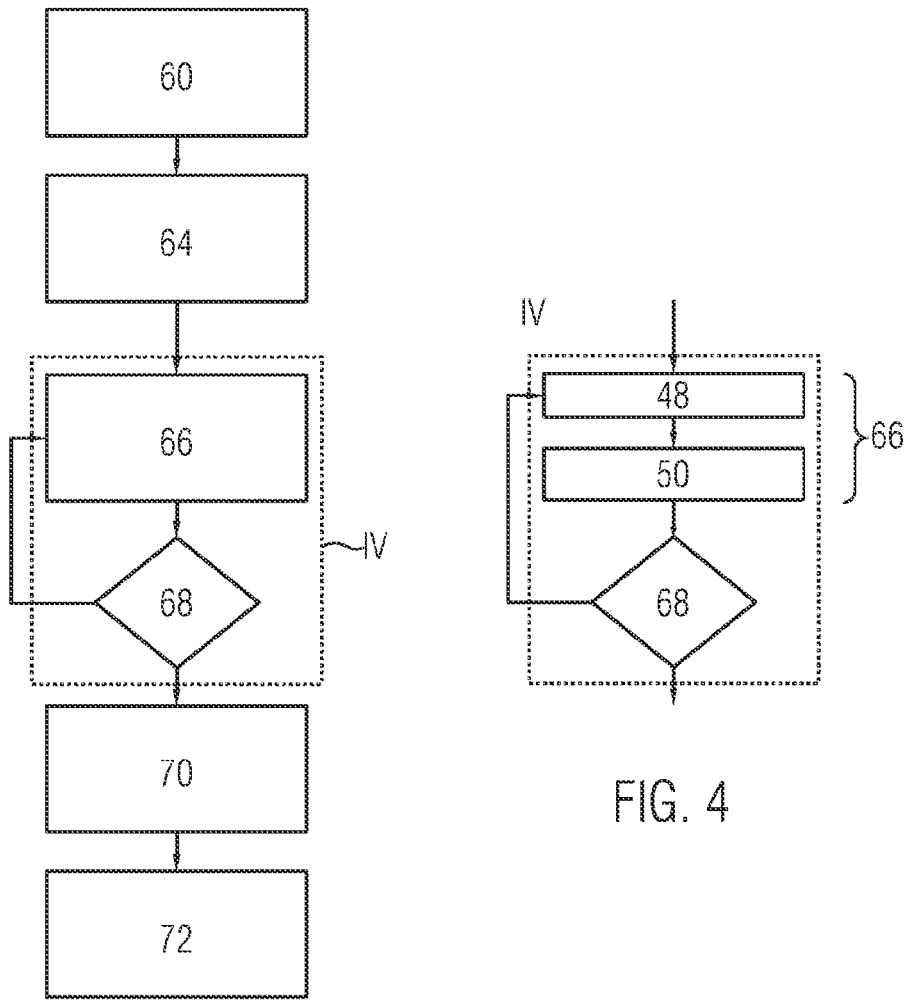
FIG. 3
FIG. 4

IMAGE PROCESSING APPARATUS AND METHOD FOR USE IN AN AUTOFOCUS SYSTEM

CROSS REFERENCE TO RELATED APPLICATIONS

This application is a U.S. National Phase application under 35 U.S.C. § 371 of International Application No. PCT/EP2020/074219, filed on Aug. 31, 2020, and claims benefit to European Patent Application No. EP 19194731.6, filed on Aug. 30, 2019. The International Application was published in English on Mar. 4, 2021 as WO 2021/038103 A1 under PCT Article 21(2).

FIELD

The invention relates to an image processing apparatus and method for use in an autofocus system, in particular a passive autofocus system, such as an autofocus system in a microscope or endoscope.

BACKGROUND

In particular, in wide-field microscopy, a software-based, passive autofocus compares the contrast of a set of stacked input images which have been acquired at different focus positions/focus distances to find the sharpest input image. The sharpest input image then defines the best focus distance or is used as an output image to be displayed to a user. An apparatus and a method based on this kind of autofocus may be used to both find the focus, i.e. find the best focus place, and hold the focus, i.e. keep a moving object in focus.

An autofocus system for microscopes is e.g. known from U.S. Pat. No. 4,958,920. This system combines a first, active autofocusing system with a second, passive autofocusing system. The active autofocusing system projects at least one light dot onto the object and develops a focusing signal dependent upon the character of a reflection of the dot. The passive autofocusing system creates a video signal representative of an image of the object and then uses the image contrast of that video signal as a focusing criterion. The video signal is an analogue signal which is high-pass filtered before being integrated and converted into a digital signal. The analogue video signal requires adjustment of the integrator for proper focusing.

SUMMARY

In an embodiment, the present disclosure provides an image processing apparatus for determining a focused output image in a passive autofocus system. The image processing apparatus is configured to retrieve a set of input images and compute at least one baseline estimate for at least one input image of the set of input images. The at least one baseline estimate represents image structures in the at least one input image. The image structures have a length scale larger than a predetermined image feature length scale. The image processing apparatus is further configured to compute a set of output images, wherein each output image of the set of output images is computed based on one of a different input image of the set of input images and the at least one baseline estimate for the different input image and the at least one baseline estimate for a respective different input image. The image processing apparatus is further configured to determine one output image of the set of output images as the focused output image.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 2 shows a schematic representation of input image data, an in-focus contribution in the input image data, an out-of-focus contribution in the input image data, baseline estimation data and output image data;

FIG. 3 shows a schematic rendition of a flow chart for an embodiment of an autofocus based on a baseline estimation;

FIG. 4 shows detail IV of FIG. 3;

DETAILED DESCRIPTION

Figure 1:
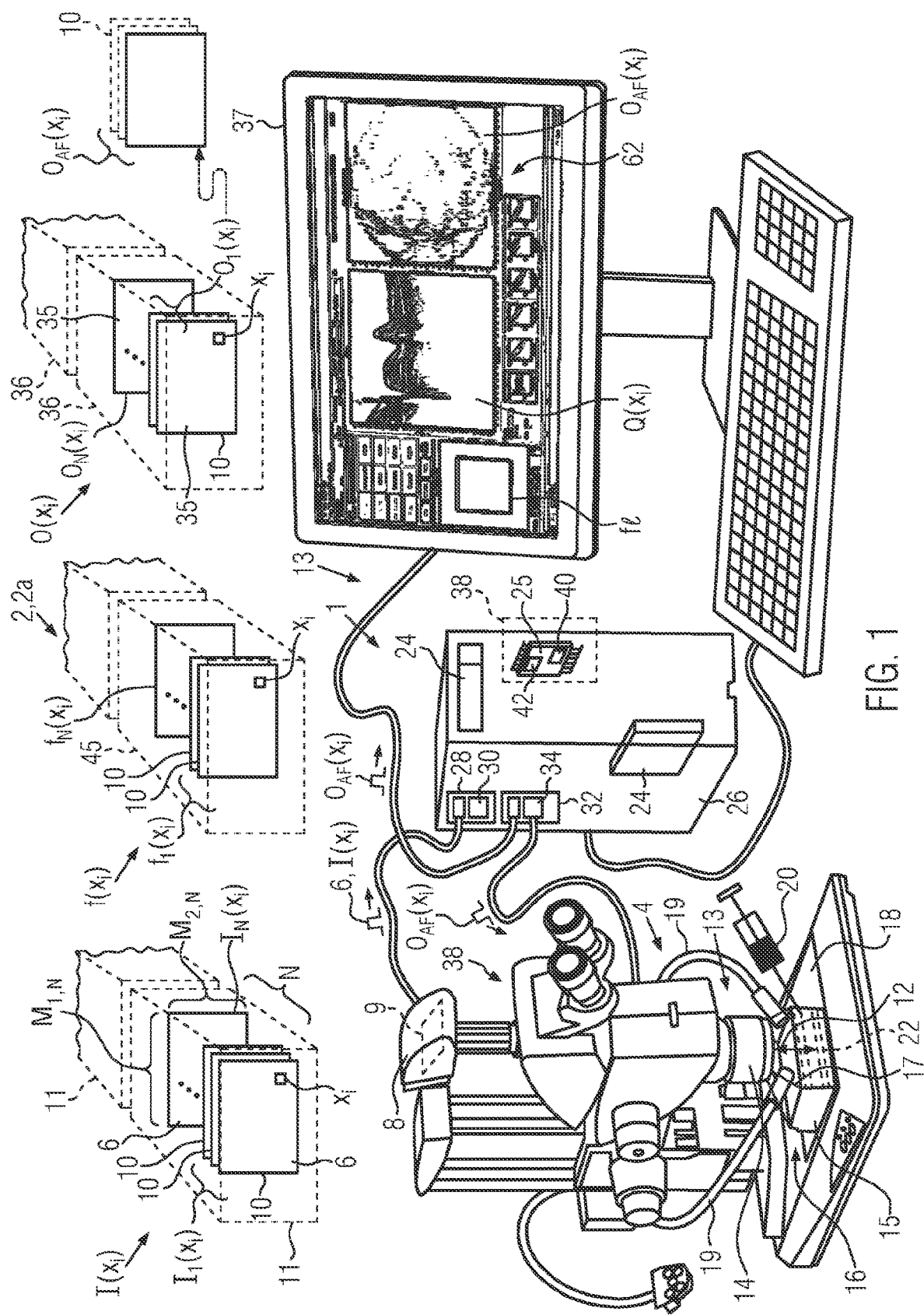
FIG. 1 shows a schematic representation of an embodiment of an image processing apparatus for use in an autofocus system, an autofocus system and an observation device comprising and autofocus system.

One disadvantage of the contrast-based autofocus is the high computational burden. Another disadvantage is that the result is not optimum for diffuse samples.

Embodiments of the present invention provide a quick and reliable, especially passive, in particular software-based autofocus, that works well for diffuse probes and can be used both for finding and holding the focus.

A quick and reliable, especially passive, in particular software-based autofocus, that works well for diffuse probes and can be used both for finding and holding the focus is provided for in an embodiment of the present invention by an image processing apparatus for determining a focused output image in an autofocus system, in particular a passive autofocus and/or software autofocus system, wherein the image processing apparatus is configured to retrieve a set of input images; to compute at least one baseline image for at least one, preferably each, input image of the set of input images, the at least one baseline estimate representing image structures in the at least one input image, the image structures having a length scale larger than a predetermined image feature length scale; to compute a set of output images; to compute each output image of the set of output images based on one of (a) a different input image of the set of input images and at least one baseline estimate for this input image (b) and the at least one baseline estimate for a respective different input image; and to determine one output image of the set of output images as the focused output image.

A quick and reliable, especially passive, in particular software-based autofocus, that works well for diffuse probes and can be used both for finding and holding the focus is provided for in an embodiment of the present invention by a computer-implemented image processing method for providing a focused output image in an autofocus system, comprising the steps of retrieving the set of input images; computing at least one baseline estimate for an output image of the set of output images, the at least one baseline estimate representing image structures having a length scale larger than a predetermined image feature length scale; computing a set of output images; the step computing the set of output images comprising the step of: computing each output image of the set of output images based on one of (a) a different input image of the set of input images and the at least one baseline estimate for this input image, and (b) the at least one baseline estimate for a respective different input image; and selecting one output image of the set of output images as the focused output image.

A quick and reliable, especially passive, in particular software-based autofocus, that works well for diffuse probes and can be used both for finding and holding the focus is provided for in embodiments of the present invention by a non-transitory computer readable medium storing a program causing a computer to execute the method according to an embodiment; by a computer program with a program code for performing the method according to an embodiment, when the computer program is run on a processor; by an output image being the result of executing the method according to an embodiment; and/or by a neural network device or a machine learning device trained by input and output image data, where the output image data are created from the input image data by the method according to an embodiment.

Both the image processing apparatus and the method make use of a baseline estimate. When a two-dimensional image of a three-dimensional region is recorded using an imaging system which might comprise an optical system and a camera, only those features will be rendered sharply that are in the focal region of the optical system. Items that are not in the focal region are blurred. The 'content' of the input image is supposed to reside in such a case in the in-focus contribution, i.e. the features that are in the focal region. The out-of-focus contribution to the image leads to artifacts that are not removed by standard engines and methods for image sharpening such as deconvolution.

The out-of-focus contribution may be represented as a baseline of the input image, i.e. by a smooth, gradual, low-frequency change involving larger length scales of image features. This mirrors the diffuse character of the out-of-focus contribution to the input image. The in-focus component may be represented as a high-frequency variation about the baseline, where the variation comprises high-frequency changes and correspondingly features of a smaller length scale. This mirrors the sharp changes in contrast over short distances that are encountered in sharply focused input images.

Computing the baseline estimate allows to predict the out-of-focus component and thus to obtain more reliably the focused output image.

The above apparatus and method may be further improved by adding one or more of the features that are described in the following. Each of the following features may be added to the image processing method, the observation device and/or the image processing apparatus independently of the other features. Moreover, each feature has its own advantageous technical effect, as is explained hereinafter.

The term 'image' relates to any kind of data that can be visualized as an image. The terms 'input image' and 'input image data' or 'digital input image data', and 'output image' and 'output image data' or 'digital output image data' are used synonymously as, ultimately, the images and their content are defined by the (digital) image data. The image data may be discrete values and be real-valued, i.e. be represented by floating-point numbers, or be integer-valued.

The term 'color' in general may relate to an input signal strength or intensity at a particular wavelength or in a particular wavelength band. The wavelength may refer to a frequency spectrum or a spatial spectrum. The term 'color' is not necessarily restricted to image input data, but may also relate to other types of input data such as listed further below. The term 'color space' equally is not restricted to input image data but may designate any set of input image data that has been recorded at different—overlapping or non-overlapping—wavelengths or wavelength bands. A wavelength in this context may correspond to a spatial or a temporal wavelength, i.e. be related to a temporal or spatial frequency. The set of wavelengths or wavelength bands, in which the input or output signal is recorded, corresponds to the 'color space'. Each one of these wavelengths or wavelength bands constitutes a separate 'channel' or 'color channel'.

For example, an input image may be a digital input image and may contain or consist of preferably digital input image data representing visible and/or non-visible light recordings, input sonar, sound and/or ultrasound data, input radar data, input spectroscopy and/or spectral data including cepstra, input microwave data, input vibrational data, such as seismographic data, input tomography data of any kind of tomography and statistical data such as stock exchange data, as well as any combination thereof. The input images may be one of one-dimensional, two-dimensional, three-dimensional and N-dimensional. An input image may be a monochrome image or a color image such as an RGB, multispectral or hyperspectral image.

An output image may be a digital output image and may contain or consist of preferably digital output image data representing visible and/or non-visible light recordings, output sonar, sound or ultrasound data, output radar data, output spectroscopy and/or spectral data including cepstra, output microwave data, output vibrational data, such as seismographic data, and statistical data, such as stock exchange data, as well as any combination thereof. The output image data may be one of one-dimensional, two-dimensional, three-dimensional and N-dimensional. The output image data may be output for further processing.

The input image is preferably an N-dimensional array $I(x_i)$, where N is an integer larger than 2. The term $x_i$ is a shortcut notation for a tuple $\{x_1; \ldots; x_N\}$ containing N location values and representing a discrete location $x_i$—or the position vector to that location—in the array. The location $x_i$ may be represented by a pixel or a preferably coherent set of pixels in the input image data. The discrete location $x_i$ denotes e.g. a pair of discrete location variables $\{x_1; x_2\}$ in the case of two-dimensional input image data and a triplet of discrete location variables $\{x_1; x_2; x_3\}$ in the case of three-dimensional input image data. In the i-th dimension, the array may contain $M_i$ locations, i.e. $x_i = \{x_{i,1}, \ldots, x_{i,m_i}\}$. In total, $l(x_i)$ may contain $(M_1 \times \ldots \times M_N)$ elements. As, in the following, no reference will be made to a concrete location or a concrete dimension, the location is indicated simply by $x_i$. The notation $x_i$ is used for the spatial domain and the notation $u_i$ for the frequency domain, although the same operations for estimation, isolation and/or removal of the baseline estimate may be used in the frequency and the spatial domain.

The input image may be a color image, a monochrome image or a color or monochrome stereoscopic images having at least two stereoscopic channels, a left stereoscopic channel and a right stereoscopic channel.

$I(x_i)$ can be any value or combination of values at the location $x_i$, such as a value representing an intensity of a color or 'channel' in a color space, e.g. the intensity of the color R in RGB space, or a combined intensity of more than one color, e.g.

$$\frac{R+G+B}{3}$$

in RGB color space. Input images that have been recorded by a multispectral or hyperspectral camera may contain more than three channels. The same is true for other types of input images.

For example, two-dimensional input images in a three-color RGB format may be regarded as three independent sets of two-dimensional input image data $I(x_i)=\{I_R(x_i); I_G(x_i); I_B(x_i)\}$, where $I_R(x_i)$ represents a value such as the intensity of the color R, $I_G(x_i)$ represents a value such as the intensity of the color G and $I_B(x_i)$ represents a value such as the intensity of the color B. Alternatively, each color may be considered as constituting a separate input image and thus separate input image data.

If the input image data have been recorded using a multispectral camera or a hyperspectral camera, more than three channels may be represented by the input image data. Each channel may represent a different spectrum or spectral range of the light spectrum. For example, more than three channels may be used to represent the visible-light spectrum.

If the object contained fluorescent materials, such as at least one fluorophore or at least one auto-fluorescing substance, each channel may represent a different fluorescent spectrum. For example, if a plurality of fluorescing fluorophores is present in the input image data, each fluorescence spectrum of one fluorophore may be represented by a different channel of the input image data. Moreover, different channels may be used for fluorescence which is selectively triggered by illumination on one hand and auto-fluorescence which may be generated as a by-product or as a secondary effect of the triggered fluorescence on the other. Additional channels may cover the NIR and IR ranges. A channel may not necessarily contain intensity data, but may represent other kind of data related to the image of the object. For example, a channel may contain fluorescent lifetime data that are representative of the fluorescence lifetime after triggering at a particular location in the image. In general, the input image data may thus have the form:

$I(x_i)=\{I_1(x_i); I_2(x_i); \ldots; I_C(x_i)\}$, where C is the total number of channels in the input image data.

The apparatus and method may start from the assumption that the in-focus contributions have a high spatial frequency and e.g. are responsible for intensity and/or color changes which take place over a short distance in the input image data. The out-of-focus contributions are assumed to have low spatial frequency, i.e. lead to predominantly gradual intensity and/or color changes that extend over larger areas of the input image data. Thus, the out-of-focus contribution is reflected in a baseline of the input image data.

Starting from this assumption, the intensity and/or color changes across the input image data may be separated additively into a high spatial frequency in-focus component $I_f(x_i)$ and a low, here spatial, frequency out-of-focus or baseline component $I_{ff}(x_i)$ as:

$I(x_i)=I_f(x_i)+I_{ff}(x_i)$.

Due to its low spatial frequency, the out-of-focus component $I_{ff}(x_i)$ can be considered as a more or less smooth baseline on which the in-focus components are superimposed as features having high spatial frequency. Preferably, the baseline is estimated using a fit to the input image data. Computationally, the fit, i.e. the baseline estimate $f(x_i)$, is represented by discrete baseline estimation data. The baseline estimation data may also be a hypercube array having N dimensions and $(M_1 \times \ldots \times M_N)$ elements and thus have the same dimensionality as the input image data.

In more general terms, the baseline estimation described may be used not only to remove the baseline estimate from the input image, but to separate a low-frequency/large-scale features contribution $I_{ff}(x_i)$ from a high-frequency/small-scale features contribution $I_f(x_i)$. These two components may then be processed and, ultimately, analyzed separately. For example, in spectral data, in particular hyperspectral data, large-scale baseline spectral features may be separated from small-scale spectral features.

The same deliberations of course apply if, instead of a spatial frequency, a temporal frequency is considered. In this case, the input image data may e.g. represent a spectrum, cepstrum or a plurality of spectra or cepstra. The baseline estimate may thus be used to extract and/or eliminate either small-scale or large-scale (baseline) signal content in the spatial or frequency domain.

For computing the baseline estimate, a least-square minimization criterion is preferably used, which is to be minimized for the fit. The exact formulation of the least-square minimization criterion determines the characteristics of the fit and thus of the baseline estimate. An improper choice of a least-square minimization criterion may cause the baseline estimate to not represent the out-of-focus component with sufficient accuracy.

In order to ensure that the baseline estimate is an accurate representation of the out-of-focus or baseline contributions in the input image data and to avoid that the baseline estimate is fitted to the in-focus contributions, the least-square minimization criterion may comprise a penalty term. The penalty term is used to penalize an unwanted behavior of the baseline estimate, such as representing components of the input image data which have high frequency content and therefore are thought to belong to the in-focus component of the input image data.

Once the baseline estimate has been determined and thus a baseline estimate $f(x_i)$ for $I_{ff}(x_i)$ has been obtained, the output image $O(x_i)$ may be obtained from the baseline estimate and the input image. In particular, the output image may be computed by subtracting the baseline estimate from the input image:

$O(x_i)=I(x_i)-f(x_i)$.

The output image $O(x_i)$ is preferably also represented by a discrete digital-data array having dimension N and $M_1 \times \ldots \times M_N$ elements and thus has preferably the same dimensionality as the input image and/or the baseline estimate.

In one particular instance, the fit may be a polynomial fit to the input image data. In particular, the baseline estimate $f(x_i)$ may be represented by a K-order polynomial in any of the N dimensions i:

$f(x_i)=\Sigma_{k=0}^{K} a_{i,k} x_i^k = a_{i,0}+a_{i,1}x_i^1+a_{i,2}x_i^2+ \ldots +a_{i,K}x_i^K$, where $a_{i,k}$ are the coefficients of the polynomial in the i-th dimension. For each dimension $i=1, \ldots, N$, a separate polynomial may be computed. According to one embodiment, the polynomial fit may be done simultaneously in a plurality of dimensions, depending on the dimensions of the input image data.

The optimum value for the maximum polynomial order K depends on the required smoothness of the baseline estimate. For a smooth baseline, the polynomial order must be set as low as possible, whereas fitting a highly irregular background may require a higher order.

In the case of a polynomial fit, the baseline estimate may consist only of the polynomial coefficients $a_{i,k}$. However, a polynomial fit might be difficult to control and not be precise because the only parameter that allows adjustment to the input image data is the maximum polynomial order. The polynomial order can only take integer values. It might therefore not always be possible to find an optimum baseline estimate. A non-optimum polynomial fit may exhibit local minima in the baseline estimation, which might lead to annoying artifacts.

Therefore, according to another advantageous embodiment, the fit to the input image data may be a spline fit, in particular a smoothing spline. A spline fit usually delivers more reliable results than a polynomial fit because it is simpler to control, e.g. in terms of smoothness, and robust to noise and creates less artifacts. On the other hand, the spline fit is computationally more complex than the polynomial fit because each pixel or, more generally, input signal value must be varied for minimizing the least-square minimization criterion.

According to one embodiment, the least-square minimization criterion $M(f(x_i))$ may have the following form:

$$M(f(x_i))=C(f(x_i))+P(f(x_i)),$$

where $C(f(x_i))$ is a cost function and $P(f(x_i))$ is the penalty term. The least-square minimization criterion, the cost function and the penalty term are preferably scalar values.

In one particular instance, the cost function represents the difference between the input image $I(x_i)$ and the baseline estimate $f(x_i)$. For example, if $\varepsilon(x_i)$ denotes the difference term between the input image and the baseline estimate as:

$$\varepsilon(x_i)=I(x_i)-f(x_i),$$

the cost function $C(f(x_i))$ may comprise the $L_2$-norm $\|\varepsilon(x_i)\|^2$, which is used here as a short hand notation of the sum of the root-mean-square values across all dimensions of the sum of squared differences between the input image data and the baseline estimate in the i-th dimension, i.e.:

$$\|\varepsilon(x_i)\|^2=\Sigma_{i=1}^N\Sigma_{m=1}^{M_i}(I(x_{i,m})-f(x_{i,m}))^2.$$

The $L_2$-norm $\|\varepsilon(x_i)\|^2$ is a scalar value. An example of a cost function is:

$$C(f(x_i))=\|\varepsilon(x_i)\|^2$$

For improving the accuracy of the baseline estimate, it may be of advantage if the difference between the input image and the baseline estimate is truncated, e.g. by using a truncated difference term. A truncated difference term reduces the effects of peaks in the input image data on the baseline estimate. Such a reduction is beneficial if the in-focus contribution is assumed to reside in the peaks of $I(x_i)$. Due to the truncated difference term, peaks in the input image data that deviate from the baseline estimate more than a predetermined constant threshold value s will be "ignored" in the cost function by truncating their penalty on the fit, in particular the spline fit, to the threshold value. Thus, the baseline estimate will follow such peaks only to a limited amount. The truncated quadratic may be symmetric or asymmetric. The truncated difference term is denoted by $\varphi(\varepsilon(x_i))$ in the following.

In some applications, the in-focus contributions may be only or at least predominantly contained in the peaks in the input image, i.e. the bright spots of an image. This may be reflected by choosing a truncated quadratic term which is asymmetric and allows the fit, in particular the spline fit, to follow the valleys but not the peaks in the input image data. For example, the asymmetric truncated quadratic $\varphi(\varepsilon(x_i))$ may be of the form:

$$\varphi(\varepsilon(x_i)) = \begin{cases} \varepsilon(x_i)^2 & \text{if } \varepsilon(x_i) \leq s \\ s^2 & \text{else} \end{cases}.$$

If, in another particular application, valleys, i.e. dark areas or regions having low values in the input image, are also to be considered as in-focus contributions, a symmetric truncated quadratic may be used instead of the asymmetric truncated quadratic. For example, the symmetric truncated quadratic may have the following form:

$$\varphi(\varepsilon(x_i)) = \begin{cases} \varepsilon(x_i)^2 & \text{if } |\varepsilon(x_i)| \leq s \\ s^2 & \text{else} \end{cases}.$$

Using a truncated quadratic, the cost function $C(f(x_i))$ preferably may be expressed as:

$$C(f(x_i))=\Sigma_{i=1}^N\Sigma_{m=1}^{M_i}\varphi(x_{i,m})$$

The penalty term $P(f(x_i))$ in the least-square minimization criterion $M(f(x_i))$ may take any form that introduces a penalty if the baseline estimate is fitted to data that are considered to belong to the in-focus component $I_1(x_i)$. A penalty is created in that the penalty term increases in value if the in-focus component in the input image is represented in the baseline estimate.

If e.g. one assumes that the out-of-focus component $I_2(x_i)$ is considered to have low spatial frequency, the penalty term may be a term that becomes large if the spatial frequency of the baseline estimate becomes large.

Such a term may be in one embodiment a roughness penalty term which penalizes non-smooth baseline estimate that deviate from a smooth baseline. Such a roughness penalty term effectively penalizes the fitting of data having high spatial frequency.

According to another embodiment, a deviation from a smooth baseline may lead to large values in at least one of the first derivative, i.e. the steepness or gradient, and the second derivative, i.e. the curvature, of the baseline estimate. Therefore, the roughness penalty term may contain at least one of a first spatial derivative of the baseline estimate, in particular the square and/or absolute value of the first spatial derivative, and a second derivative of the baseline estimate, in particular the square and/or absolute value of the second spatial derivative. More generally, the penalty term may contain a spatial derivative of any arbitrary order of the baseline estimate, or any linear combination of spatial derivatives of the baseline estimate. Different penalty terms may be used in different dimensions.

For example, the penalty term $P(f(x_i))$ may be formed as:

$$P(f(x_i))=\Sigma_{j=1}^N\gamma_j\Sigma_{l=1}^N\Sigma_{m=1}^{M_i}(\partial_j^{2f}(x_{i,m}))^2.$$

This penalty term is a scalar function that penalizes a large rate of change in the gradient of the baseline estimate or, equivalently, a high curvature, and thus favors smooth estimates. It may therefore be termed as roughness penalty term. In the above formula, $\gamma_j$ is a regularization length scale and $\partial_j^2$ is a discrete operator for computing the second derivative in the j-th dimension. The sum over j allows to use different terms in different dimensions.

In the discrete, the differentiation may be computed efficiently using a convolution. For example, as follows:

$$\delta_j^{2f}(x_{i,m}) = D_{i,m}^{(j)} * f(x_{i,m})$$

with a second order derivative matrix:

$$D_{i,m}^{(j)} = \begin{cases} 1 & \text{if } m = 1, M_j \text{ and } i = j \\ -2 & \text{if } m = 0 \text{ and } i = j \\ 0 & \text{else} \end{cases}$$

Alternatively, the penalty term $P(f(x_i))$ may be formed as $$P(f(x_i)) = \Sigma_{j=1}^{N} \gamma_j \Sigma_{i=1}^{N} \Sigma_{m=1}^{M_i} (\partial_j f(x_{i,m}))^2.$$

This is a penalty term that penalizes small-scale features and large gradients in the baseline estimate. It should be noted that, as $x_{i,m}$ and $f(x_i)$ are both discrete, the differentiation can be carried out by convolution with a derivative array $\partial_j$. The operator $\partial_j$ represents a discrete first-order derivative or gradient operator in the dimension j.

As the penalty term is a scalar quantity, the units of the regularization length scale $\gamma_j$ and the squared derivative operator need to cancel each other. As the $n^{th}$ derivative $\partial_j^n$ has the unit [length]$^{-n}$ if the corresponding dimension of the input image has the unit [length], the general n-th order derivative term $(\partial_j^n f(x_{i,m}))^2$ of the penalty term has the unit [length]$^{-2n}$. Consequently, the regularization length scale $\gamma_j$ has the unit [length]$^{2n}$, i.e. may be viewed as representing an image feature length scale fl that is raised to the $(2^n)^{th}$ power, $\gamma_j = \text{fl}^{2n}$. This also holds for any combination of derivatives such as a partial second-order derivative in more than one direction or a linear combination of derivatives. In the latter case, each order of derivatives may be assigned a different regularization length scale, as e.g. in the following example of penalty term involving a combination of a first-order and second-order derivative with respective regularization length scales:

$$P(f(x_i)) = \Sigma_{j=1}^{N} \Sigma_{i=1}^{N} \Sigma_{m=1}^{M_i} [\gamma_{1,j}(\partial_j f(x_{i,m}))^2 + \gamma_{2,j}(\partial_j^{2f}(x_{i,m}))^2].$$

The regularization length scale separates image features into features that belong to the out-of-focus contribution from features that belong to the in-focus contribution. Image features having a length scale larger than the length scale reflected in the regularization length scale will be reflected in the baseline estimate. Image features that have a length scale that is smaller than the length scale are not reflected in the baseline estimate. Thus, by setting the regularization length scale to an image feature length scale fl, that e.g. may be predetermined or set by a user, e.g. $\gamma_j = \text{fl}^2$ for a first-order derivative of the baseline estimate in the penalty term or $\gamma_j = \text{fl}^4$ for a second-order derivative of the baseline estimate in the penalty term, structures of a certain size may be chosen to be reflected in the baseline estimate. In more general terms, the regularization length scale is a function of the image feature length scale, $\gamma_j = \gamma_j(\text{fl}_j)$, with the feature length preferably being the sole variable.

If, for a single input image, two different baselines $f_I(x_i)$ and $f_{II}(x_i)$ are computed, where, for one baseline estimate, $f_I(x_i)$, a first image feature length scale $\text{fl}_I$, and for the other baseline estimate, $f_{II}(x_i)$, a second image feature length scale $\text{fl}_{II}$ was used in the respective regularization length scale with $\text{fl}_I > \text{fl}_{II}$, then $f_{II}(x_i) - f_I(x_i)$ yields those structures in the image of which the length scales are between $\text{fl}_I$ and $\text{fl}_{II}$.

Instead of or in addition to a derivative or a linear combination of derivatives of the baseline estimate, the penalty term may contain a feature-extracting, in particular linear, filter or a linear combination of such filters. Feature-extracting filters may be a Sobel-filter, a Laplace-filter, and/or a FIR filter, e.g. a high-pass or band-pass spatial filter having a pass-band for high spatial frequencies.

It should be noted in this context, that in a two-dimensional input image, such as a color image, multispectral image or hyperspectral image, which has a plurality of different color channels, the wavelength or color may form a third dimension, if the color channels are not regarded separately. A separate image feature length scale which reflects a spectral length scale is then assigned to this dimension. Such an image feature length scale may be used to assign abrupt color changes to the "in-focus" component and long-range color changes to the "out-of-focus" component.

Moreover, in a three-dimensional color, multispectral and hyperspectral image, another dimension may relate to the third spatial dimension, for which another image feature length scale may be defined.

In such a general formulation, the penalty term for the j-th dimension may contain general operators $\zeta^{(j)}$ and be expressed as:

$$P(f(x_i)) = \Sigma_{j=1}^{N} \gamma_j \Sigma_{i=1}^{N} \Sigma_{m=1}^{M_i} [\zeta^{(j)}(f(x_{i,m}))]^2.$$

The least-square minimization criterion $M(f(x_i))$ may be minimized using known methods. In one instance, a preferably iterative minimization scheme may be used. In particular a half-quadratic minimization scheme may be used. For performing the minimization, the baseline estimator engine may comprise a minimization engine, which in particular may be a half-quadratic minimization engine. The minimization scheme or engine may comprise an iteration mechanism having two iteration stages.

The minimization scheme may e.g. comprise at least part of the LEGEND algorithm, which is computationally efficient. The LEGEND algorithm is described in Idier, J. (2401): *Convex Half-Quadratic Criteria and Interacting Variables for Image Restoration*, IEEE Transactions on Image Processing, 10(7), p. 1001-1009, and in Mazet, V., Carteret, C., Bire, D, Idier, J., and Humbert, B. (2405): *Background Removal from Spectra by Designing and Minimizing a Non-Quadratic Cost Function*, Chemometrics and Intelligent Laboratory Systems, 76, p. 151-163. Both articles are herewith incorporated by reference in their entirety.

Other minimization schemes which may be applied for computing the baseline estimate are described in Wang, G. et al. (2014): *Morphological Background Detection and Illumination Normalization of Text Image with Poor Lighting*, PLoS One, 2019, 9 (II), el 10991, which is incorporated by reference in its entirety.

The LEGEND algorithm introduces discrete auxiliary data $d(x_i)$ that are preferably of the same dimensionality as the input image data. The auxiliary data are updated at each iteration depending on the latest initial baseline estimate, the truncated quadratic term and the input image data.

In the LEGEND algorithm, the least-square minimization criterion is minimized using two iterative steps until a convergence criterion is met.

A suitable convergence criterion may, for example, be that the sum of the differences between the current baseline estimate and the previous baseline estimate across all locations $x_i$ is smaller than a predetermined threshold.

In a further improvement, the convergence criterion may be expressed as:

$$\frac{\sum_{i=0}^{N} \sum_{m=0}^{M_i} |f_{(l)}(x_{i,m}) - f_{(l-1)}(x_{i,m})|}{\sum_{i=0}^{N} \sum_{m=0}^{M_i} f_{(l)}(x_{i,m}) + f_{(l-1)}(x_{i,m})} < t,$$

where t is a scalar convergence value which may be set by the user and (l) is the iteration index.

As a starting step in the LEGEND algorithm, an initial set of baseline estimation data for the baseline estimate is defined.

The LEGEND algorithm may be started by selecting a starting set of coefficients $a_k$ for a first baseline estimate $f_{(0)}(x_i) = \Sigma_{k=0}^{K} a_{i,k} x_i^k$ for each of the i=1, ..., N polynomials if a polynomial fit is used.

If a spline fit is used, the initial condition for starting the LEGEND algorithm may be $d(x_i)=0$, $f(x_i)=I(x_i)$ and the iteration is started by entering at the second iterative step.

In the first iterative step, the auxiliary data may be updated as follows:

$$d_{(l)}(x_i) = \begin{cases} (2\alpha - 1)(I(x_i) - f_{(l-1)}(x_i)) & \text{if } \varepsilon(x_i) \le s \\ -I(x_i) + f_{(l-1)}(x_i) & \text{else} \end{cases},$$

where l=1 ... L is the index of the current iteration and a is a constant that may be chosen. Preferably, a is close but not equal to 0.5. A suitable value of a is 0.493.

In a second iterative step, the baseline estimate $f_{(l)}(x_i)$ are updated based on the previously calculated auxiliary data $d_{(l)}(x_i)$, the baseline estimate $f_{(l-1)}(x_i)$ from the previous iteration (l-1) and on the penalty term $P(x_i)$.

The baseline estimate $f_{(l)}(x_i)$ may be minimizing a minimization criterion $M(f(x_i))$ which has been modified for the LEGEND algorithm by including the auxiliary data.

In particular, the updated baseline estimate may be computed using the following formula in the second iterative LEGEND step:

$$f_{(l)}(x_i) = \underset{f}{\operatorname{argmin}}[\|I(x_i) - f_{(l-1)}(x_i) + d_{(l)}(x_i)\|^2 + P(f(x_i))]$$

Here, $[\|I(x_i)-f_{(l-1)}(x_i)+d(l)(x_i)\|^2+P(f(x_i))]$ represents the modified minimization criterion.

The second iterative step may update the baseline estimate using the following matrix computation:

$$f_l(x_i)=(1+\Sigma_{i=1}^{N}\gamma_i A_i^T A_i)^{-1}(I(x_i)+d(x_i)))$$

Here $(1+\Sigma_{i=1}^{N}\gamma_i A_i^T A_i)$ is a $(M_1 \times ... \times M_N)^2$ dimensional array. In the two-dimensional case, $A_i$ is a $(M_x-1)(M_y-1) \times M_x M_y$ array and given as:

$$A_i = \begin{pmatrix} \hat{A} & -\hat{A} & \hat{0} & \cdots & \hat{0} \\ \hat{0} & \hat{A} & -\hat{A} & \ddots & \vdots \\ \vdots & \ddots & \ddots & \ddots & \hat{0} \\ \hat{0} & \cdots & \hat{0} & \hat{A} & -\hat{A} \end{pmatrix}$$

with:

$$A_i = \begin{pmatrix} 1 & -1 & 0 & \cdots & 0 \\ 0 & 1 & -1 & \ddots & \vdots \\ \vdots & \ddots & \ddots & \ddots & 0 \\ 0 & \cdots & 0 & 1 & -1 \end{pmatrix}, \hat{0} = \begin{pmatrix} 0 & 0 & 0 & \cdots & 0 \\ 0 & 0 & 0 & \ddots & \vdots \\ \vdots & \ddots & \ddots & \ddots & 0 \\ 0 & \cdots & 0 & 0 & 0 \end{pmatrix} \in \mathbb{R}^{(M_x-1) \times M_x}$$

The two iteration steps for updating $d_{(l)}(x_i)$ and $f_{(l)}(x_i)$ are repeated until the convergence criterion is met.

According to a highly preferable embodiment, the second step of the LEGEND algorithm is modified using a convolution instead of a matrix computation. This greatly reduces the computational effort.

More particularly, it is preferred that the updated baseline estimate $f_{(l)}(x_i)$ is computed directly by convolving a Green's function with the sum of the input image data and the updated auxiliary data.

According to a more concrete embodiment of the inventive solution, the second iterative step of the LEGEND algorithm may be replaced by the following iterative step, where the updated baseline estimate $f_{(l)}(x_i)$ is computed in the l-th iteration using a Green's function $G(x_i)$ as follows:

$$f_l(x_i)=G(x_i)*(I(x_i)+d_{(l)}(x_i)).$$

This step reduces the computational burden significantly as compared to the traditional LEGEND algorithm.

The reduced computational burden results from the fact that according to the inventive second iterative step, a convolution is computed. This computation can be efficiently carried out using an FFT algorithm. Moreover, the second iterative step may make full use of an array processor, such as a graphics processing unit or an FPGA due to the FFT algorithm. The computational problem is reduced from $(M_x \times M_y)^2$ to $M_x \times M_y$ if the input image data and all other arrays are two-dimensional. For a general N-dimensional case, the computational burden is reduced from $(M_1 \times ... \times M_N)^2$ dimensional matrix calculations to the computation of a FFT with $(M_1 \times ... \times M_N)$-dimensional arrays Thus, the computation and removal of the baseline estimate may be carried out very quickly, preferably in real time for two-dimensional input image data. A (2k×2k) output image may be computed in 50 ms and less.

In one specific embodiment, the Green's function may have the form:

$$G(x_{i,m}) = F^{-1}\left[\frac{1}{1 - \sum_{j=1}^{N} \gamma_j F[D_{i,m}^{(j)}]}\right],$$

where F[ ... ] is the discrete N-dimensional Fourier transform, $F^{-1}$[ ... ] is the inverse discrete N-dimensional Fourier transform, $\gamma_j$ is the regularization length scale of the roughness penalty term, $D_{i,m}^{(j)}$ is a discrete penalty array in the i-th dimension at location m, and N is the total number of dimensions. The upper index $D^{(j)}$ indicates that there may be a different penalty array for each dimension j.

In general, the discrete penalty array $D_{i,m}^{(j)}$ corresponds to the discrete representation of the functional derivative $$\frac{\delta P^{(j)}(f(x_i))}{\delta f(x_{i,m})}$$

of the penalty term $P^{(j)}(f(x_i))$ that is used for the j-th dimension. As all functions are represented by discrete arrays, the differentiation can be carried out numerically by a convolution:

$$D_{i,m}^{(j)} * P^{(j)}(x_{i,m}).$$

where $D_{i,m}^{(j)}$ is the discrete array for computing the functional derivative $$\frac{\delta}{\delta f(x_{i,m})}.$$

A big advantage of the above Green's function is that any form of penalty term $P(f(x_i))$ may benefit from the fast computation of the second iterative step in the minimization engine. Thus, in the embodiment which uses the Green's function, any penalty term for obtaining a good baseline estimate may be used.

For the general formulation of the penalty term:

$$P(f(x_i)) = \Sigma_{j=1}^{N} \gamma_j \Sigma_{i=1}^{N} \Sigma_{m=1}^{M_i} [\zeta^{(j)}(f(x_{i,m}))]^2.$$

the array $D_{i,m}^{(j)}$ is defined by:

$$D_{i,m}^{(j)} * P(f(x_{i,m})) = 0.5 \nabla_f \Sigma_{j=1}^{N} \gamma_j \Sigma_{i=1}^{N} \Sigma_{m=1}^{M_i} [\zeta^{(j)} f(x_{i,m})]^2,$$

where $\zeta^{(j)}$ is a general operator of the penalty term, * denotes the N-dimensional convolution and $\nabla_f$ corresponds to the discrete first-order functional derivative in function $f(x_{i,m})$, which may e.g. represent intensity. This equation can be solved by means of the least squares method.

For example, if the penalty term is:

$$P(f(x_i)) = \Sigma_{j=1}^{N} \gamma_j \Sigma_{i=1}^{N} \Sigma_{m=1}^{M_i} (\partial_{j,f}(x_{i,m}))^2,$$

the derivative array in the convolution may be expressed as:

$$D_{i,m}^{(j)} = \begin{cases} 2 & \text{if } m = 0 \text{ and } i = j \\ -1 & \text{if } m = 1 \text{ or } M_i \text{ and } i = j. \\ 0 & \text{else} \end{cases}$$

With any variant of the above-described computational schemes, the image processing apparatus may be configured to compute at least one baseline estimate $f(x_i)$, for an input image $I(x_i)$. However, a common baseline estimate $f(x_i)$ may be used for two or more input images, if these input images differ by less than a predetermined amount. For example, a correlation of the two or more input images may be computed and, if the correlation is above a predefined threshold, the same baseline estimate is used. This decreases the computational burden.

The set of input images that is retrieved by the image processing apparatus may represent a stack of input images that were recorded e.g. by a microscope or an endoscope, at different focus distances of an objective, such as an autofocus objective. The set may comprise N input images $I_1(x_i) \ldots I_N(x_i)$. Alternatively or additionally, the set of input images may represent a stack of input images that were recorded e.g. by a microscope or an endoscope at different positions in a plane perpendicular to an optical axis of an optical system, in particular of an objective of the optical system, especially an autofocus objective, or to the focus distance or, equivalently, parallel to the focus plane, i.e. that are shifted in the x-/y-direction, i.e. in a direction parallel to the focal plane or, equivalently, perpendicular to the focus distance. Such an auto-focus system may be used to track objects that move. The set of input images, or subsequent sets of input images may represent a time-varying object, different input images of a time-invariant object, such as input images taken with different focal lengths, from different positions, and/or in different colors, or any combination thereof.

The image processing apparatus may be configured to remove the at least one baseline estimate $f(x_i)$ from the respective input image of the set, for which the baseline estimate has been computed. If this step is repeated for each of the input images of the set, a set of output images is obtained. As a result, an output image is obtained for each input image. Thus, from N input images N output images $O_1(x_i) \ldots O_N(x_i)$ are obtained.

The set of output images is de-blurred when the out-of-focus component is removed, e.g. by subtraction, as described above. The de-blurred output images allow a more reliable determination of the output image that is in focus, i.e. the focused output image $O_{AF}(x_i)$.

By adjusting the image feature length scale fl, the focused output image may be determined using only features that have a certain length scale. If the determination of the focused output image is to be based on features that have a length scale which is larger than the image feature length scale fl, the baseline estimate may be directly used as the output image. If the determination of the focused output image is to be based on features that have a length scale which is smaller than the image feature length scale, the selection is based on an output image which is computed by removing the baseline estimate from the respective input image. If the selection of the focused output image is to be based on features that have a length scale which is within a certain range, two baseline estimates $f_I(x_i)$ based on a first length scale $fl_{I,j}$ and $f_{II}(x_i)$ based on a different second image feature length scale $fl_{II,j}$ may be computed and subtracted for each input image to obtain a respective output image. The image feature length scales may be independent of the direction j.

The focused output image may be determined from the set of output images by using a focus function. Focus functions are e.g. described in Groen, F. C.; Young, I. T.; Ligthart G. (1985): A Comparison of Different Focus Functions for Use in Autofocus Algorithms, in: *Cytometry* 1985, 6(2): 81-91, which is herewith incorporated by reference in its entirety.

In particular, the focus function may comprise at least one focus function of the following list:

Computation of an amount of entropy, for example information entropy, contained in the input image and/or the output image;

Computation of a contrast in at least part of the input image and/or the output image;

Computation of an intensity and/or intensity distribution in at least part of the input image and/or the output image;

Computation of a phase correlation;

Computation of a correlation with a predetermined pattern.

As can be seen from the above, the term "focus" is to be understood broadly as not only comprising the identification of the output image that is sharpest but also as the identification of the output image that contains a certain pattern and/or the sharpest and/or brightest and/or best correlating representation of a pattern, such as for object tracking.

For example, that output image may be selected as a focused output image $O_{AF}(X_i)$ that has the lowest information entropy.

For pattern correlation, a static or variable pattern may be used. For example, the pattern may be predetermined by a user. Alternatively, a previously-selected focused output image may be used as a pattern, automatically or set by the user.

Any output image of the set of output images may be post-processed before selecting the focused output image from the set. The post-processing may comprise at least one of deconvolution, histogram modification, unsharp masking, edge enhancement, noise reduction, and/or image morphology techniques to enhance the sharpness of images, such as top-hat transformations.

Likewise, the input images may be pre-processed before computing the baseline estimate. For example, a top-hat transform may be carried out on one or more, or all input images. Further, the pre-processing of an input image may comprise at least one of deconvolution, histogram modification, unsharp masking, edge enhancement, noise reduction, and processing to increase sharpness. The pre-processing serves to optimize the image quality. The pre-processing may further comprise filtering at least parts of an input image e.g. using image analysis workflows and/or machine learning.

The image processing apparatus may further be configured to control an autofocus objective depending on the focused output image, such as depending on the location of the focused output image in the set of output images, or on a focus distance, in which the input image, which resulted in the output image that was selected as the focused output image, was recorded. For example, the input image and/or the output image may comprise depth data which are representative of the focus distance of a focal plane, in which the respective input image was recorded. The image apparatus may be configured to control the autofocus objective depending on the depth data.

For example, the image processing apparatus may be configured to control an imaging system to record a set of input images centered around the focal plane of the input image that resulted in the focused output image, e.g. by a (motorized) xy-movement of a specimen holder or a specimen table of the imaging system.

For object tracking, the image processing apparatus may be configured to control movement of the field of view relative to a probe volume or probe depending on the focused output image. In such an embodiment, the input image and/or the output image derived from the input image, may contain positional information representing a position parallel to the focal plane, preferably in addition to depth data as described above.

For example, the image processing apparatus may be configured to move the field of view and the probe volume relative to each other depending on the focused output image. In doing so, an object may be tracked and be kept in a predetermined position, e.g. the center, of the field of view.

The image processing apparatus may further comprise an image processor, which may be configured to compute the baseline estimate. The image processor may comprise a baseline estimator engine. The baseline estimator engine may be adapted to compute a baseline estimate and to obtain an output image from the baseline estimate. The baseline estimator engine may comprise a discrete representation of least—square minimization criterion ($M(x_i)$).

The image processor, the baseline estimator engine and the minimization engine may each be implemented in hardware, in software or as a combination or hardware and software. For example, at least one of the image processor, the baseline estimator engine, and the minimization engine may be at least partly be implemented by a subroutine, a section of a general-purpose processor, such as a CPU, and/or a dedicated processor such as a CPU, GPU, FPGA, vector processor and/or ASIC.

The apparatus may comprise an image storage section. More specifically, the image processor may comprise the image storage section. The signal storage section may be configured to contain the input image data, at least temporarily. The signal storage section may be implemented purely in hardware or in software, or as a combination of hardware and software. For example, the storage section may be an array of data or a subroutine. Alternatively or additionally, the storage section may comprise a hard disk, a memory device and comprise volatile and non-volatile memory, in which the array and/or subroutine is stored.

The apparatus may comprise an input section. More specifically, the image processor may comprise the input section. The input section may be adapted to retrieve the input image. The input section may be implemented purely in hardware or in software, or as a combination of hardware and software. For example, the input section may be a software function, e.g. a data transfer protocol, and comprise an array of data which serves as an interface for data transfer. Alternatively or additionally, the input section may comprise at least one standardized connector such as a USB, HDMI and/or DisplayPort connector.

The apparatus may comprise an output section. More specifically, the image processor may comprise the output section. The output section may be adapted to output the output image. The output section may be implemented purely in hardware or in software, or as a combination of hardware and software. For example, the output section may be a software function, e.g. a data transfer protocol, and comprise an array of data which serves as an interface for data transfer. Alternatively or additionally, the output section may comprise at least one standardized connector such as a USB, HDMI and/or DisplayPort connector.

The image processing apparatus may be part of a microscope or endoscope, which preferably comprises an autofocus objective. The autofocus objective is preferably configured to be controlled by the image processing apparatus depending on the focused output image.

The observation device may comprise an actuating system for moving a probe relative to a field of view of an objective. The image processing apparatus may be configured to control the position of the field of view relative to the probe by operating the actuator system. For example, a set of subsequent input images may be recorded centered around the location, here in the x-, y- and possibly also the z-direction of the previous focused output image.

Another way of implementing the baseline estimation and autofocus algorithm is to train a machine learning device such as an artificial neural network, e. g. a convolutional neural network, using pairs of input image data and output image data, where the output image data have been generated using an embodiment of the above described method. A machine learning device which has been trained this way, or, equivalently, a copy of such a trained device can be regarded as an implementation of the method which has been used to generate the training pairs of input and output image data.

It is to be noted that the apparatus and method provide best results if the input image $I(x_i)$ are—in the case of input image data as input image data—not convolved or deconvolved before the removal of the out-of-focus or in-focus component. Any deconvolution provides the best results if the image to be deconvolved is preprocessed by having the baseline estimate removed or corresponding to the baseline estimate.

Next, the image processing apparatus, the image processing method and the observation device are further described by way of example only using a sample embodiment, which is also shown in the drawings. In the drawings, the same reference numerals are used for features which correspond to each other with respect to at least one of function and design.

The combination of features shown in the enclosed embodiment is for explanatory purposes only and can be modified. For example, a feature of the embodiment having a technical effect that is not needed for a specific application may be omitted. Likewise, a feature which is not shown to be part of the embodiment may be added if the technical effect associated with this feature is needed for a particular application.

First, the structure and function of an image processing apparatus 1 and method is explained with reference to FIG. 1. The image processing apparatus 1 may be part of an observation device 2, such as an endoscope or a microscope 2a. Just for the purpose of explanation, a microscope 2a is shown as an example of an observation device 2. For the purpose of the apparatus and method, there is no difference between endoscopes of microscopes.

The observation device 2 may comprise an imaging system 4, which is adapted to capture input image data 6, e.g. with one or more cameras 8, preferably in digital format. The camera may comprise an image sensor 9. The image sensor may comprise a photon detector, a photo diode, a line sensor, a sensor array, a monochrome, a CCD, an RGB, a multispectral or a hyperspectral line or array sensor which records the input image data 6 in one or more color channels 10, wherein each channel 10 preferably represents a different light spectrum range of electromagnetic radiation. The input image data 6 are also designated as input image $I(x_i)$ in the following.

In particular, the imaging system 4 or, more specifically, its camera 8 may be configured to capture a stack or set 11, or subsequent stacks or sets 11, of input images $I(x_i)$. The set 11 contains N input images $I_1(x_i) \ldots I_N(x_i)$. Thus, at least some of the input images of a set are captured at different focus distances 12. The input images are digital input images in the shown embodiment.

For automatically finding a focus or holding a focus, the imaging system 4 may comprise an autofocus system 13. The autofocus system 13 is preferably a passive autofocus system, i.e. it has no active sensor for measuring the focus distance 12, but may also be an active autofocus system. Further, the autofocus system 13 is preferably software-based. The image processing apparatus 1 may be a part of the autofocus system 13. The observation device and/or the autofocus system may comprise an autofocus objective 14.

In the case of a CCD camera recording in RGB color space, for example, three channels 10, e.g. a R-channel, a G-channel and a B-channel, may be provided to represent a visible-light, or white-light, color input image of an object 15. In the case of a multi- or hyperspectral camera, more than three channels 10 may be used per input image in at least one of the visible light range, the IR light range, the NIR light range and the ultraviolet light range.

The input image data 6 may be considered as being two-dimensional if a single channel 10 is contained in a two-dimensional image. The input image may have a higher dimensionality than two if more than two channels 10 are considered as constituting the input image I(xi) and/or if the input image data 6 represent a three-dimensional array, such as a three-dimensional image.

The object 15 is located in a probe volume 16 of the imaging system 4. The probe volume is configured to receive the object 15 to be inspected by the apparatus 1. For this, the probe volume should be located in a field of view 17 of the imaging system 4, in particular of the objective 14.

The observation apparatus may comprise an actuator system 18, which is configured to move the field of view 17 and the probe volume 16 or the object 15 relative to each other and/or relative to the autofocus objective. The actuator system may comprise e.g. an electric motor to move the object and/or part of the imaging system, such as the objective 14 in a direction perpendicular to the focus distance or parallel to a focal plane. This movement may occur simultaneously or synchronized with a change of the focus distance 12.

The object 15 may comprise animate and/or inanimate matter. The object 15 may further comprise one or more fluorescent materials, such as at least one fluorophore 20. A multispectral or hyperspectral camera may have a channel 10 for each different fluorescence spectrum of the fluorescent materials in the object 15. For example, each fluorophore 20 may be represented by at least one channel 10 which is matched to the fluorescence spectrum triggered by an illumination system 19.

Alternatively or additionally, separate channels 10 may be provided for auto-fluorescence spectra or for spectra of secondary fluorescence, which is triggered by fluorescence excited by the illumination system 19, or for lifetime fluorescence data. Of course, the illumination system 19 may also or solely emit white light or any other composition of light without triggering fluorescence in the object 15. The microscope 2 may be adapted to excite fluorescence e.g. of fluorophores 20 within an object 15 with light having a suitable fluorescence excitation wavelength by the illumination system 19. The illumination system 19 may be arranged opposite the imaging system 4 with respect to the probe volume 16 and/or on the same side as the imaging system 4.

If the illumination system 19 is arranged on the same side as the imaging system 4, its light may be guided through the autofocus objective 14, through which also the input image data 6 are acquired. The illumination system 19 may comprise or consist of one or more flexible light guides to direct light onto the object 15 from one or more different directions. A suitable blocking filter may be arranged in the light path in front of the camera 8 or the autofocus objective 14, e.g. to suppress glare. In case of fluorescence, a blocking filter preferably blocks only the illumination wavelength and allows the fluorescent light of the at least one fluorophore 20 in the object 15 to pass to the camera 8.

If the illumination system is arranged opposite the probe volume 16, its light may pass through the probe volume 16.

It is apparent—without limitation to the general—that the input image data 6 can be captured by any kind of microscope, in particular with a fluorescence light microscope operable in a wide-field mode and/or using a confocal laser scanning microscope, or by any kind of endoscope.

The set 11 of input images may be captured by e.g. using light-field technology, z-stacking in microscopes, images obtained by a SPIM microscope, a SCAPE microscope, moving the field of view and the probe or probe volume relative to each other or relative to the objective 14 in a direction perpendicular to the focus distance and/or parallel to a focal plane, and/or a three-dimensional reconstruction of images obtained by a SPIM microscope. Each input image of the set 11 represents a different focus plane 22. In the case of a three-dimensional image, each focus plane 22 may be considered as a two-dimensional grey value or color input image 6. Each plane may comprise several channels 10. The autofocus system 13 is preferably configured to capture an input image $I(x_i)$ automatically in a predetermined focal plane. For the sake of simplicity, the index of the input image in the set 11 is omitted in the following.

The input image data 6 are a digital representation of a quantity $I(x_i)$, such as an intensity, where $x_i$ represents a location in the input image data 6 and I is the quantity at that location which constitutes the input image. The term $x_i$ is a shortcut notation for a tuple $\{x_1; \ldots; x_N\}$ containing N dimensions and representing a discrete location $x_i$ in the discrete input image data. A location $x_i$ may be a pixel or a preferably coherent set of pixels in the input image data. The discrete location $x_i$ denotes e.g. a pair of discrete location variables $\{x_1; x_2\}$ in the case of two-dimensional input image data and a triplet of discrete location variables $\{x_1; x_2; x_3\}$ in the case of three-dimensional input image data. In the i-th dimension, the array may contain $M_i$ locations, i.e. $x_i = \{x_{i,1}, \ldots, x_{i,M_i}\}$. In total, $I(x_i)$ may contain $(M_1 \times \ldots \times M_N)$ elements. $I(x_i)$ may be an array of discrete real-valued, e.g. represented as digital floating-point numbers, or of integer-valued data.

The image processing apparatus 1 may further comprise a storage section 24 which is adapted to contain, at least temporarily, the input image data 6. The storage section 24 may comprise a volatile or non-volatile memory, such as a cache memory of a CPU 25 of an e.g. general-purpose computing device 26, such as a PC, and/or of a GPU 27. The storage section 24 may further comprise RAM, a hard disk drive or an exchangeable storage section, such as a USB stick or an SD card. The storage section 24 may comprise any combination of these types of memory. Alternatively or additionally, the storage section may also be implemented as a software device, e.g. as a subroutine, function or an array.

For retrieving the set 11 of input images, an input section 28 may be provided. The input section 28 may comprise standardized connection means 30, such as standardized data exchange protocols, hardware connectors and/or wireless connections, or any combination thereof. Examples of standardized connectors which may be connected to the camera 8 are HDMI, USB and RJ45 connectors. Alternatively or additionally, the input section may be implemented in software, e.g. as a subroutine, function or array, which serves as a software interface for the transfer of data. The input section 28 may be part of the image processing apparatus 1.

The image processing apparatus 1 may be configured to compute for each input image $I(x_i)$ in the set 11 an output image $O(x_i)$, so that a stack or set 31 of output images is obtained from the set of input images. Thus, for N input images $I_1(x_i) \ldots I_N(x_i)$, N output images $O_1(x_i) \ldots O_N(x_i)$ are computed. Again, the indices are omitted for the output images in the following to keep the notation simple. The output images are digital output images in the shown embodiment.

The image processing apparatus 1 may further comprise an output section 32 which may comprise standardized connection means 34, such as standardized data exchange protocols, hardware connectors and/or wireless connections, each configured to output output image data 35 to one or more displays 37. The output image data 35 have preferably the same dimensionality as the input image data 6, and are represented by a discrete array of discrete values, forming an output image $O(x_i)$. The output image data 35 may be real or integer-valued. Alternatively or additionally, the output section may be implemented in software, e.g. as a subroutine, function or array, which serves as a software interface for the transfer of data. The output section 32 may be part of the image processing apparatus 1.

For computing an output image $O(x_i)$ from an input image $I(x_i)$, an image processor 38 may be provided. The image processor 38 may be at least partly hardware, at least partly software and/or a combination of both hardware and software. For example, the image processor 38 may comprise at least one of a CPU 25 and a GPU 27 of a general-purpose computing device 26, as well as data structures and sections that have been coded in software and temporarily exist as structural entities in the CPU 25 and/or the GPU 27 in an operational state. The image processor 38 may also comprise additional hardware such as memory and/or one or more ASICs which have been specifically designed in carrying out operations required for the image processing apparatus and method.

Before continuing the further description of FIG. 1, the general principle of processing an input image $I(x_i)$ of a set 11 is explained with reference to FIG. 2. For estimating the baseline $f(x_i)$ of an input image $I(x_i)$, the image processor 38 may comprise a baseline estimator engine 40. The following holds for any of the input images in the set 11.

The input image $I(x_i)$ may be assumed to be composed additively from an in-focus component $I_I(x_i)$, which contains the in-focus component, i.e. structures of the object 15 that lie within the focus plane 22 of the input image, and an out-of-focus component $I_{II}(x_i)$, which may mainly contain light from the background, i.e. light from outside the focus plane 22. Neither $I_I(x_i)$ nor $I_{II}(x_i)$ are known and therefore have to be estimated.

For estimating $I_I(x_i)$ and $I_{II}(x_i)$, it is assumed that the out-of-focus component $I_{II}(x_i)$ is smooth and consists of or comprises predominantly components having low spatial frequency, i.e. large spatial extent. The out-of-focus component thus represents a baseline about which the in-focus component $I_I(x_i)$ fluctuates at a higher spatial frequency. The out-of-focus component $I_{II}(x_i)$ is assumed to be smooth and as having large length scales; the in-focus component $I_I(x_i)$ is, by contrast, assumed not to be smooth and to contain at least one of peaks and valleys. Depending on the application, the information of interest may reside either in $I_I(x_i)$ or in $I_{II}(x_i)$ An estimate for the out-of-focus component $I_{II}(x_i)$ is represented by a baseline estimate $f(x_i)$. The baseline estimate is a discrete array of baseline estimation data 44 that has preferably the same dimensionality as the input image. The baseline estimate $f(x_i)$ may be at least temporarily present in the storage section 24. As at least one baseline estimate $f(x_i)$ is computed for each input image, the set 11 of input images results in a set 45 of baseline estimates. If it is determined, e.g. by computing a correlation, that two input images $I(x_i)$ do not deviate from one another beyond a predetermined threshold, a baseline estimate $f(x_i)$ which has already been computed for one of the two input images $I(x_i)$ may be used for the other of the two input images $I(x_i)$. For this, each baseline estimate $f(x_i)$ may be stored at least temporarily in the storage section. In the set 45, each baseline estimate is associated with one input image of the set 11.

Once the baseline estimate has been computed, the in-focus component, here represented as $O(x_i)$ may be obtained by removing, in particular, subtracting the baseline estimate $f(x_i)$ from the input image $I(x_i)$ at each location $x_i$.

The image processing apparatus 1 may be configured to preprocess at least one input image, preferably all input images, I($x_i$) of a set 11. For example, the image apparatus 1 may be configured to apply a top-hat transform to the at least one input image I($x_i$). In addition or alternatively, the image processing apparatus 1 may be configured to apply in the pre-processing a filter, unsharp masking, histogram equalization, morphological filtering, and other methods for enhancing the image quality.

The baseline estimator engine 40 is configured to compute the baseline estimate $f(x_i)$ by a fit to at least a subset of the input image data 6 which make up an input image I($x_i$). Preferably, the fit to at least the subset of the input image data is a spline fit.

For a computationally efficient spline fit, the baseline estimator engine 40 may comprise a minimization engine 46, which may, for example, be a subroutine or a combination of a hard-wired algorithm and a matching software. The minimization engine 46 may be configured to execute a minimization scheme and, towards this end, may comprise two iteration stages 48, 50.

Preferably, the minimization engine 46 comprises a convolution to compute the baseline estimate $f(x_i)$ in the second iteration stage 50. As the convolution can be computed more efficiently on an array processor using a FFT, it is preferred that the image processor 38 includes an array processor such as a GPU 27. In operation, the image processor comprises the minimization engine 46.

With reference to FIG. 3, the steps of computing an output image O($x_i$) from an input image I($x_i$) are described as they are performed by the image processing apparatus 1.

In a first step 60, various parameters of the baseline estimator engine 40, which need to be preset, may be defined by a user, e.g. using a graphical user interface 62 (FIG. 1). The parameters may comprise the type of fit to the input image data 6 that is to be performed by the baseline estimator engine 40. For example, a user may choose between a polynomial fit and a spline fit of the baseline estimation data 44 to the input image data 6.

Further, the user may choose between a variety of penalty terms P($f(x_i)$) which are used in the minimization scheme. The penalty term determines the shape of the baseline estimate by penalizing the representation of components of the in-focus contribution I$_f$($x_i$) in the baseline estimate.

For example, the user may be presented with a selection of various penalty terms that penalize non-smooth characteristics of the baseline estimate. For instance, the penalty term may be a high-pass spatial frequency filter for the baseline estimation data 44, which gets larger if the baseline estimate contains components having high spatial frequency. Other penalty terms may include a gradient of the baseline estimate. Another example of a penalty term may be the curvature of the baseline estimate. Further, feature extracting filters, such as a Sobel, Laplace and/or FIR band-pass, high-pass or low-pass filter may be selected by the user as penalty term. Further, a linear combination of any of the above may be selected. Different penalty terms may be selected for different dimensions or for different channels of the input image data 6.

The general representation of the penalty term is as follows $$P(f(x_i)) = \Sigma_{j=1}^{N} \gamma_j \Sigma_{i=1}^{N} \Sigma_{m=1}^{M_i} [\zeta^{(j)}(f(x_{i,m}))]^2,$$

where $\zeta^{(j)}$ is a general operator of the penalty term, which defines the property of the penalty term.

In the following, it is assumed that the user selects a gradient-based roughness penalty term based on the gradient of the baseline estimate $f(x_{i,m})$ having the following form $$P(f(x_i)) = \Sigma_{j=1}^{N} \gamma_j \Sigma_{i=1}^{N} \Sigma_{m=1}^{M_i} (\partial_j f(x_{i,m}))^2.$$

This penalty term penalizes large gradients in the baseline estimate. The operator $\partial_j$ represents a first-order derivative or gradient in the dimension j. However, the user may be presented with a selection and select any order and combination of derivatives of the baseline estimate. For example, the user may select a second-order derivative $\partial_j^2$ instead of the above first-order derivative, a combination of a first and a second-order derivative, or a combined second-order derivative $\partial_{i,j}^2$ in two directions $x_i$ and $x_i$.

Using the above gradient-based penalty term, the parameters to be specified by the user further comprise an array $\gamma_j$ of direction-dependent regularization length scales for each direction or dimension j. The direction-dependent regularization length scale $\gamma_j$ represents a direction-dependent length scale such as an image feature length scale fl$_j$. A feature in the image that has a length scale in direction $x_j$ that is smaller than the corresponding image feature length scale fl$_j$ is considered to belong to the in-focus contribution and not to the baseline. Structures in the input image having a length larger than the image feature length scale in the respective direction j are considered to belong to the baseline. As is clear from the index j of $\gamma_j$, the regularization length scale and thus the image feature length scale may be different in each direction. Of course, there may also be used just one constant image feature length scale and/or one constant regularization length scale for any direction. The user may be prompted to input either the regularization length scale or the image feature length scale. The latter is preferred as it is more intuitive for the user and independent of the exact formulation of the penalty term.

As the penalty term P($f(x_i)$) is a scalar value, the product of the regularization length scale, $\gamma_j$, and the general operator $\zeta^{(j)}(f(x_{i,m}))$ must be scalar. If the general operator is for example a gradient, the regularization length scale has the unit [length]$^2$. If the general operator is a second-order derivative, the regularization length scale has the unit [length]$^4$. In this embodiment where a gradient is used, the regularization length scale has the unit [length]$^2$ and is thus equal to the square of the image feature length scale $y_i$=fl$_j^2$.

The user may further select whether he wants to have image features that have a length scale larger than the specified image feature length scale or smaller than the specified image feature length scale regarded as the content of interest. In the former case, the baseline estimate itself will be regarded as output image, O($x_i$)=$f(x_i)$, in the latter case, the baseline estimate needs to be removed from the input image to obtain the desired content.

Further, the user may select a first and a second image feature length scale, fl$_{I,j}$ and fl$_{II,j}$, fl$_{I,j}$≠fl$_{II,j}$, or corresponding regularization length scale $\gamma_{I,j}$ and $\gamma_{II,j}$, which may also be direction-independent and in this case be formulated as $\gamma_I$ and $\gamma_{II}$, or fl$_I$ and fl$_{II}$, respectively. For each of the first and the second image feature length scale, a different baseline estimate $f_I(x_i)$ and $f_{II}(x_i)$ may be computed from the resulting, different, penalty term. In the baseline estimate $f_I(x_i)$, image features having a length scale larger than the feature image length scale fl$_I$ are contained whereas in the baseline estimate $f_{II}(x_i)$ image features having a length scale larger than the feature length scale fl$_{II}$ are contained. Image feature having a length scale smaller than the first and the second image feature length scale are not represented in the respective baseline estimate or at least strongly suppressed.

Specifying two different image feature length scales allows to compute an output image $O(x_i)$ in which only features of a length scale are represented that falls within the range limited by the two image feature length scales simply by removing, in particular subtracting, one baseline estimate $f_I(x_i)$ from the other, $f_{II}(x_i)$.

Further, the user may specify a pattern $Q(x_i)$ for which to search in the set 31 of output images. The pattern may e.g. be an image of an object 15 or a part thereof. For example, the pattern may be a mitochondrion.

Further, the user may choose between a symmetric and asymmetric, in particular truncated, quadratic term $\varphi(\varepsilon(x_i))$, which also determines the shape of the baseline estimate by specifying the effect of large peaks on the baseline estimate. A value for the truncation may also be specified by the user.

For example, the user may select the following asymmetric, truncated quadratic:

$$\varphi(\varepsilon(x_i)) = \begin{cases} (I(x_i) - f(x_i))^2 & \text{if } \varepsilon(x_i) \leq s \\ s^2 & \text{else} \end{cases},$$

in which s represents a threshold value which may be input by the user. The threshold value defines a maximum deviation between the input image data and the baseline estimate. Peaks above the baseline estimate do not attract the baseline estimate more than a peak which deviates by the threshold value.

Finally, the user may select a convergence criterion and/or a threshold value t which has to be reached by the convergence criterion.

After the user-definable parameters for the baseline estimator engine 40 have been set, the data are initialized in step 64 for the iterative minimization scheme 66.

FIG. 4, detail IV of FIG. 3 is shown to explain the minimization scheme 66 in closer detail. The minimization scheme 66 comprises the first iteration stage 48 and the second iteration stage 50.

In principle, the minimization scheme 66 as carried out by the minimization engine 46 may be the LEGEND algorithm. However, it is preferred to modify the second step of the LEGEND algorithm may be modified to significantly reduce the computational burden.

In the shown embodiment, the second iterative stage 50 is entered after initializing the data at step 64. At this point, the first estimate $f_{(1)}(x_i)$ of the baseline estimate is computed by using a convolution of the input image data with a Green's function $G(x_i)$. The index in parenthesis indicates the iteration index.

$$f_{(1)}(x_i) = G(x_i) * I(x_i)$$

For the gradient-based penalty term used in this embodiment, the Green's function is defined as follows:

$$G(x_{i,m}) = F^{-1}\left[\frac{1}{1 - \sum_{j=1}^{N} \gamma_j F[D_{i,m}^{(j)}]}\right],$$

where F[ . . . ] is the discrete N-dimensional Fourier transform, $F^{-1}$[ . . . ] is the inverse discrete N-dimensional Fourier transform, $\gamma_j$ is the regularization length scale of the roughness penalty term and $$D_{i,m}^{(j)} = \begin{cases} 2 & \text{if } m = 0 \text{ and } i = j \\ -1 & \text{if } m = 1 \text{ or } M_i \text{ and } i = j \\ 0 & \text{else} \end{cases}.$$

Then, in the first iteration stage 48, an updated version of auxiliary data $d_{(l)}(x_i)$ may be computed using the current baseline estimate $f_{(l-1)}(x_i)$ as follows:

$$d_{(l)}(x_i) = \begin{cases} (2\alpha - 1)(I(x_i) - f_{(l-1)}(x_i)) & \text{if } \varepsilon(x_i) \leq s \\ -I(x_i) + f_{(l-1)}(x_i) & \text{else} \end{cases}.$$

The parameter a is a constant which may have been specified by the user.

Next, in the second iterative stage 50, the updated baseline estimate $f_{(l-1)}(x_i)$ is computed using the updated auxiliary data $d_{(l)}(x_i)$ of the current iteration (l) as follows $$f_{(l)}(x_i) = G(x_i) * (I(x_i) + d_{(l)}(x_i))$$

In the next step, it is checked whether the convergence criterion 68 is met. If this is not the case, the minimization scheme 66 proceeds to iterative step 48 using the updated baseline estimate $f_{(l)}(x_i)$.

The iterative minimization scheme 66 is carried out by the minimization engine 46 until a convergence criterion 68 is met. In the embodiment, the following convergence criterion is used as an example:

$$\frac{\sum_{i=0}^{N} \sum_{m=0}^{M_i} |f_{(l)}(x_{i,m}) - f_{(l-1)}(x_{i,m})|}{\sum_{i=0}^{N} \sum_{m=0}^{M_i} f_{(l)}(x_{i,m}) + f_{(l-1)}(x_{i,m})} < t,$$

where (l) indicates the current iteration and t is a constant scalar threshold value which may be user-specified. If the convergence criterion 68 is met, it is assumed that the baseline estimate been successfully computed.

Instead of the above minimization scheme for the baseline estimation, any other minimization scheme may be used, e.g. a minimization scheme described in Wag, G. et al. (2014): Morphological Background Detection and Illumination Normalization of Text Image with Poor Lighting, *PLoS One*, 2019, 9 (II), e110991.

If two different image feature length scales $fl_{I,j}$ and $fl_{II,j}$ have been specified by the user, the above steps 64 to 68 are carried out twice, once for each different image feature length scale, resulting in two baseline estimates $f_I(x_i)$ and $f_{II}(x_i)$, one baseline estimate for each different image feature length scale. In other words, one baseline estimate $f_I(x_i)$ is computed using the regularization length scale $\gamma_{I,j} = fl_{I,j}^2$ and the other baseline estimate $f_{II}(x_i)$ is computed using the regularization length scale $\gamma_{II,j} = fl_{II,j}^2$.

In step 70, the output image $O(x_i)$ is obtained from the respective input image. How the output image is computed depends on the user settings.

If, for example, the user has selected that the features of the image he is interested in have a length scale smaller than the selected image feature length scale fl, the baseline estimate $f(x_i)$ is removed, in particular subtracted, $O(x_i) = I(x_i) - f(x_i)$, from the input image data $I(x_i)$ to obtain the output image data $O(x_i)$ in step 70.

If the user has selected that he is interested in the features that are larger than the image feature length scale, the output image is set to be equal to the baseline estimate, $O(x_i) = f(x_i)$ in step 70.

If the user is interested in features in an input image that have a length scale between the two specified image feature length scales $fl_I$ and $fl_{II}$, wherein $fl_{II} > fl_I$, then the baseline estimate based on the larger image feature length scale is subtracted from the baseline estimate based on the smaller image feature length scale, $O(x_i) = f_I(x_i) - f_{II}(x_i)$.

Step 70 may further contain a post-processing of the output image. The post-processing may comprise any automatic image enhancement such as at least one of unsharp masking, deconvolution, edge enhancement, histogram modification and noise reduction.

The steps 64 to 70 are carried out for each input image of the set 11, so that for each input image $I(x_i)$ an output image $O(x_i)$ is obtained.

Step 72 relates to identifying the focused output image $O_{AF}(x_i)$ in the set 36 that defines the result of the autofocusing procedure. For selecting the output image $O_{AF}(x_i)$ several focus functions may be applied independently from another or in any combination, depending of the application and the user settings.

The focused output image $O_{AF}(x_i)$ may e.g. be selected by computing a correlation between the pattern $Q(x_i)$, or perform any other kind of pattern-matching. The output image, in which the pattern-matching results in the highest correlation may be selected. A focus function of this type may in particular be used to identify or track features across subsequently recorded sets 11 of input images.

The output image of the set 36 may be selected as focused output image $O_{AF}(x_i)$ that has the highest contrast, either overall or in one or more color channels, and/or in one or more predetermined or automatically determined regions.

The output image of the set 36 may be selected as focused output image $O_{AF}(x_i)$ that has an information entropy that is below a predetermined, e.g. user-specified, threshold.

The output image of the set 36 may be selected as focused output image $O_{AF}(x_i)$ that has the highest intensity and/or narrowest intensity distribution overall or in one or more color channels.

Other focus functions are e.g. described in Groen, F. C.; Young, I. T., Ligthart, G. (1985): A Comparison of Different Focus Functions for Use in Autofocus Algorithms, in: Cytometry, 1985 6(2), 81-91, which is herewith interpreted by reference in its entirety.

The output image of the set 36 may be selected as focused output image $O_{AF}(x_i)$ that has the highest correlation with the previously selected output image from the previous set of input images.

If there are more than two output images which satisfy the focus function, the output image that lies in the middle may be selected as focused output image $O_{AF}(x_i)$. If two output images satisfy the focus function, the one with the smaller focus distance may be selected.

In step 74, the selected output image $O(x_i)$, i.e. $O_{AF}(x_i)$, is stored, e.g. in storage section 24, and/or displayed, e.g. on display 37. Before being displayed, the selected focused output image $O_{AF}(x_i)$ may be processed further, e.g. undergo deconvolution, unsharp masking or any other image enhancement, that has not yet been performed on the output images $O(x_i)$.

If the imaging system 4 acquires subsequent sets 11, e.g. continuously, the steps 64 to 74 are carried out for each set, preferably in real time. Thus, for each of the input images $I_n(x_i)$ of the set 11, $n=1 \ldots N$, a baseline estimate $f_n(x_i)$ is obtained using preferably the same image feature length scale f 1. Each output image $O_n(x_i)$ is computed as described above from the respective at least one baseline estimate $f_n(x_i)$ or $f_I(x_i)$, $f_{II}(x_i)$, or the respective input image $I_n(x_i)$ and its baseline estimate $f_n(x_i)$.

Figure 5:
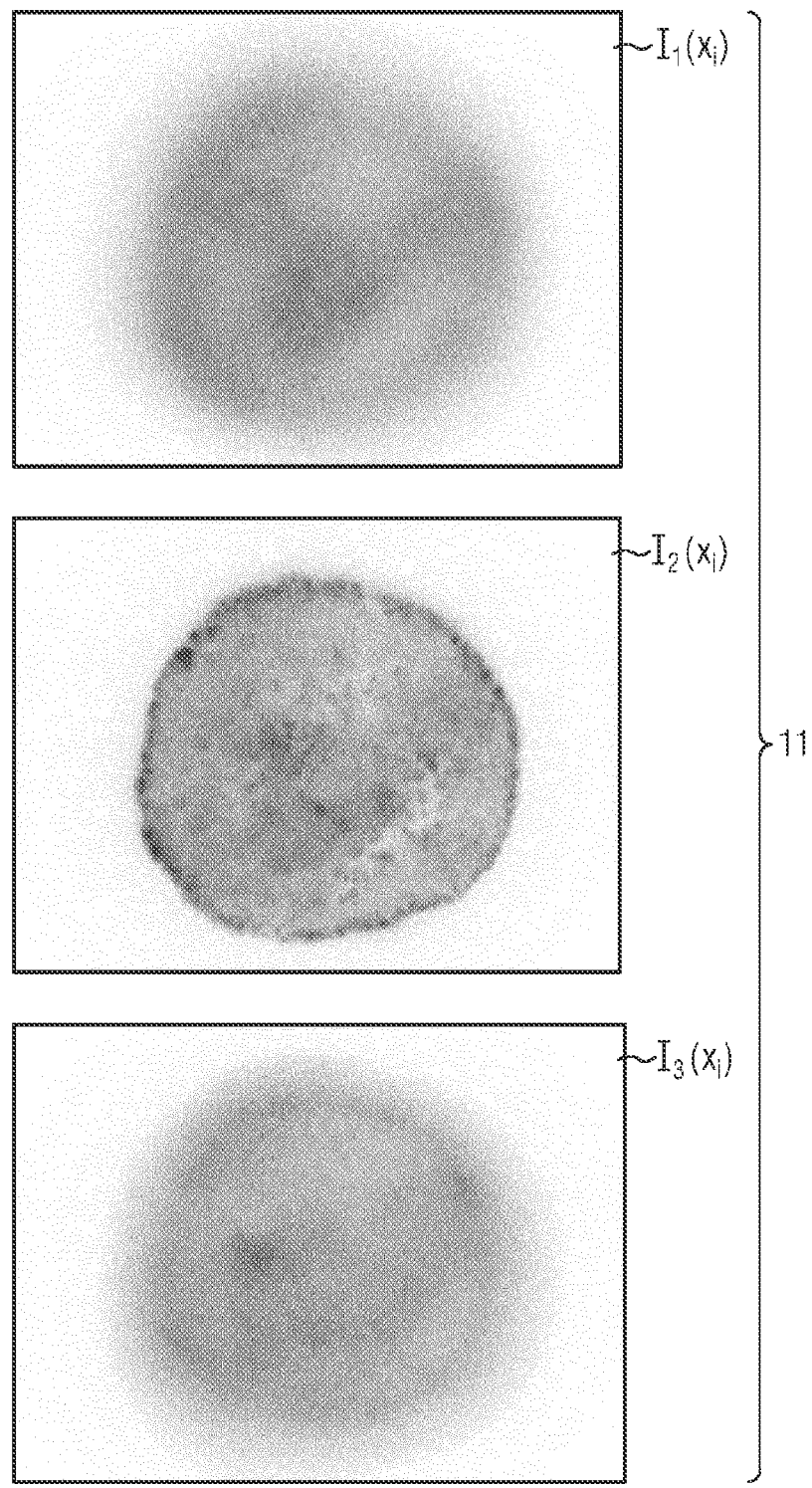
FIG. 5 shows a schematic rendition of a set of input images.

FIG. 5 shows a set 11 of three input images $I_I(x_i)$, $I_{II}(x_i)$, and $I_{III}(x_i)$ which were obtained by focus stacking using a microscope. The input images are blurred due to a strong out-of-focus component. The blur makes it difficult to determine the correct focused image.

Figure 6:
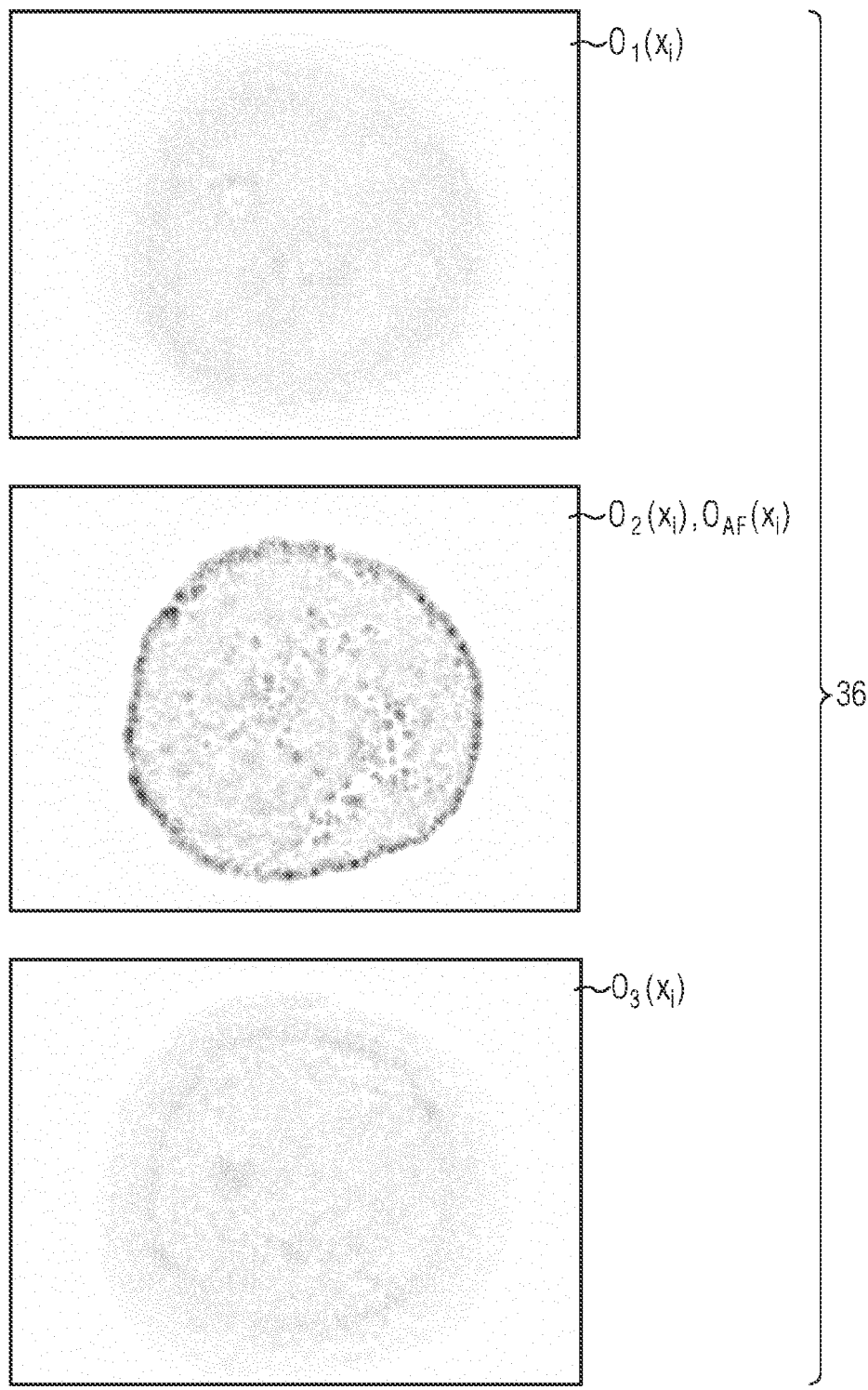
FIG. 6 shows a schematic rendition of a set of output images.

FIG. 6 shows three output images $O_I(x_i)$, $O_{II}(x_i)$, and $O_{III}(x_i)$, which have been obtained from the respective input image $I_I(x_i)$, $I_{II}(x_i)$, and $I_{III}(x_i)$ of FIG. 5 by computing a respective baseline estimate $f_I(x_i)$, $f_{II}(x_i)$, and $f_{III}(x_i)$ based on an image feature length scale fl, which was chosen to be the same for all three input images. The baseline estimate $f_n(x_i)$, was then removed, in particular subtracted, from the respective input image $I_n(x_i)$ to obtain the respective output image $O_n(x_i)$, n=1, 2, 3. As can be seen from FIG. 6, the output images in the set 31 contain significantly less blur, which allows for the determination of a focused image much easier and with greater certainty than by using the original input images. The focused image is determined using a focus function, for example, by selecting the output image of the set 31 which has the highest contrast. In the example of FIG. 6, output image $O_2(x_i)$ is determined as the focused output image $O_{AF}(x_i)$.

Of course, any number of input images may be contained in the set 11 to produce the corresponding amount of output images in the set 31.

If two or more input images in a set 11 or across several input images have only minor differences, the same baseline estimate may be used for each of these input images. This saves computational costs. For example, the image processing apparatus may be configured to store a baseline estimate of an input image, e.g. in the storage device, and to compute a correlation between two different input images and to determine if the correlation exceeds a predetermined threshold. If it is determined by the image processing apparatus that the predetermined threshold is exceeded or not exceeded depending on the correlation measure, the image apparatus may be configured to retrieve the stored baseline estimate of the correlating, previously obtained input image and apply it to compute the output image corresponding to the newly obtained input image.

The image processing apparatus may be configured to control the actuator system 18 to move the field of view 17 and the probe volume 16/object 15 relative to each other and/or the autofocus objective 14 to change the focus distance 12, depending on the focused output image $O_{AF}(x_i)$ and/or the input image from which the focused output image was derived. For this, each input image or output image may contain positional data, which is representative for a focus distance, a z position and/or a (x, y) position. The focus distance 12 and/or the relative position of the field of view 17 and the object 15 may be controlled by the image processing apparatus depending on the positional data of the focused output image or the corresponding input image. The image processing apparatus 1 may be configured to generate a focus-distance control signal which is representative of the focus distance to be set by e.g. an autofocus objective 14, depending on the positional data. Alternatively or additionally, the image processing apparatus 1 may be configured to generate an object positioning signal which is representative of the relative position of the field of view and the object to be set by e.g. the actuator system 18.

In particular, the observation device 2 may be configured to record a subsequent set 11 of input images depending on the focused output image derived from the previous set 11 of input images. In particular, the subsequent set 11 of input images may centered about the position of the focused output image of the previous set.

The observation device 2 may further be configured to move the probe volume relative and the field of view relative to each other depending on the focused output image, the input image from which the focused output image was derived, and/or the positional data in the focused input image or the input image from which the focused output image was derived.

Alternatively or additionally, the device 2 may be configured to adjust the focus distance 12 depending on the focused output image, the input image from which the focused output image was derived, and/or the positional data in the focused input image or the input image from which the focused output image was derived.

As used herein the term "and/or" includes any and all combinations of one or more of the associated listed items and may be abbreviated as "/".

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a processor, a microprocessor, a programmable computer or an electronic circuit. In some embodiments, some one or more of the most important method steps may be executed by such an apparatus.

Depending on certain implementation requirements, embodiments of the image processing apparatus can be implemented fully in hardware or fully in software, or in a combination of both software and hardware. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods de-scribed herein, stored on a machine readable carrier.

In other words, an embodiment of the present invention is, therefore, a computer program having a program code for performing one of the methods described herein, when the computer program runs on a computer.

A further embodiment of the present invention is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

A further embodiment of the invention is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a micro-processor in order to perform one of the methods described herein. Generally, the methods are preferably performed by any hardware apparatus.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMERALS 1 image processing apparatus
2 observation device 2a microscope
4 imaging system
6 input image data
8 camera
9 image sensor
10 channel
11 set of input images
12 focus distance
13 autofocus system
14 autofocus objective
15 object
16 probe volume
17 field of view
18 actuator system
19 illumination system
20 fluorophore
22 focus plane
24 storage section
25 CPU
26 computing device
27 GPU
28 input section
30 connection means of input section
32 output section
34 connection means of output section
35 output image data
36 set of output images
37 display
38 image processor
40 baseline estimator engine
44 baseline estimation data
45 set of baseline estimates
46 minimization engine
48 first iteration stage
50 second iteration stage
60 setup of baseline estimation parameters
62 graphical user interface
64 initializing of minimization engine and scheme
66 minimization engine and scheme
68 convergence criterion
70 computation of output image data
72 post-processing operation
74 display

The invention claimed is:

1. An image processing apparatus for determining a focused output image in a passive autofocus system, the image processing apparatus being configured to:
retrieve a set of input images;
compute at least one baseline estimate for at least one input image of the set of input images using a least-square minimization criterion, the least-square minimization criterion comprising a scalar combination of a predetermined image feature length scale and a derivative of the baseline estimate;
compute a set of output images;
compute each output image of the set of output images based on one of a different input image of the set of input images and the at least one baseline estimate for the different input image and the at least one baseline estimate for a respective different input image; and
determine one output image of the set of output images as the focused output image.

2. The image processing apparatus according to claim 1, wherein the image processing apparatus is configured to compute each output image of the set of output images based on a different input image and the at least one baseline estimate for the different input image, and is further configured to:
remove the at least one baseline estimate from the respective input image to obtain an output image of the set of output images.

3. The image processing apparatus according to claim 1, wherein the image processing apparatus is further configured to:
compute for an input image of the set of input images a first baseline estimate based on a first predetermined image feature length scale and a second baseline estimate based on a second image feature length scale, the second image feature length scale being different from the first image feature length scale, and
compute an output image based on the first and the second baseline estimate.

4. The image processing apparatus according to claim 3, wherein the image processing apparatus is further configured to:
remove one of the baseline estimates based on a larger image feature length scale from one of the baselines estimate based on a smaller image feature length scale.

5. The image processing apparatus according to claim 1, wherein the image processing apparatus is further configured to:
obtain a baseline estimate as an output image of the set of output images.

6. The image processing apparatus according to claim 1, wherein the least-square minimization criterion comprises a penalty term, the penalty term containing the image feature length scale.

7. The image processing apparatus according to claim 1, wherein the image processing apparatus is further configured to use a focus function to determine the one output image of the set of output images as the focused image.

8. The image processing apparatus according to claim 7, wherein the focus function comprises at least one focus function of the following list:
computation of an amount of entropy contained in the input image and/or the output image;
computation of a contrast in at least a part of the input image and/or the output image;
computation of an intensity and/or an intensity distribution in at least part of the input image and/or the output image;
computation of a phase correlation; and
computation of a correlation with a predetermined pattern.

9. The image processing apparatus according to claim 1, wherein the image processing apparatus is further configured to pre-process at least one input image of the set of input images using a top-hat transform.

10. The image processing apparatus according to claim 1, wherein the image processing apparatus is further configured to pre-process at least one input image of the set of input images to improve image quality and/or for filtering.

11. An autofocus system comprising the image processing apparatus according to claim 1, and an imaging system comprising an image sensor and an autofocus objective.

12. An observation device comprising the image processing apparatus according to claim 1, and a display, the display being configured to display the focused output image.

13. The observation device according to claim 12, the observation device being one of a microscope and an endoscope.

14. A computer-implemented image processing method for determining a focused output image in a passive autofocus system, the method comprising:
    retrieving a set of input images;
    computing at least one baseline estimate for at least one input image of the set of input images using a least-square minimization criterion, the least-square minimization criterion comprising a scalar combination of a predetermined image feature length scale and a derivative of the baseline estimate;
    computing a set of output images;
    the step computing the set of output images comprising the step of:
    computing each output image of the set of output images based on one of a different input image of the set of input images and the at least one baseline estimate for the different input image and the at least one baseline estimate for a respective different input image; and
    selecting one output image of the set of output images as the focused output image.

15. The computer-implemented image processing method according to claim 14, wherein the step of retrieving the set of input images comprises the step of automatically capturing at least some input images of the set of input images at different focus distances and/or different relative positions of a field of view and an object.

16. A computer-implemented autofocusing method, comprising the image processing method of claim 14 and a step of displaying the selected output image.

17. A tangible, non-transitory computer readable medium storing a computer program causing a computer to execute the image processing method according to claim 14 when the computer program is executed by the computer.

18. A machine learning device configured for use in an autofocus system, trained by sets of input images and selected output images, wherein the selected output images are created from the set of input images by the method according to claim 14.

\* \* \* \* \*